United States Patent
Zhang et al.

(10) Patent No.: US 11,743,453 B2
(45) Date of Patent: *Aug. 29, 2023

(54) PULSE CODE MODULATION TECHNIQUE IN VIDEO PROCESSING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/376,036

(22) Filed: Jul. 14, 2021

(65) Prior Publication Data
US 2021/0344908 A1    Nov. 4, 2021

Related U.S. Application Data

(63) Continuation of application No. 17/071,590, filed on Oct. 15, 2020, now Pat. No. 11,095,882, which is a
(Continued)

(30) Foreign Application Priority Data

Nov. 22, 2018    (WO) ............... PCT/CN2018/116885

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/159* (2014.11);
(Continued)

(58) Field of Classification Search
CPC .. H04N 19/105; H04N 19/117; H04N 19/159; H04N 19/176; H04N 19/186;
(Continued)

(56) References Cited

U.S. PATENT DOCUMENTS 10,750,172 B2    8/2020    Vanam et al.
11,095,882 B2    8/2021    Zhang et al.
(Continued)

FOREIGN PATENT DOCUMENTS

CN    101127907 A    2/2008
CN    103248892 A    8/2013
(Continued)

OTHER PUBLICATIONS

Non-Final Office Action from U.S. Appl. No. 17/071,590 dated Nov. 27, 2020.
(Continued)

*Primary Examiner* — Matthew K Kwan
(74) *Attorney, Agent, or Firm* — Perkins Coie LLP

(57) ABSTRACT

Devices, systems and methods for digital video coding, which include pulse code modulation techniques, are described. An exemplary method for video processing includes determining, for a current block of video, that at least one of a first coding mode in which pulse code modulation is used or a second coding mode in which multiple reference line based intra prediction is used is enabled, and performing, based on the first coding mode or the second coding mode, a conversion between the current block and a bitstream representation of the video, wherein a first indication indicative of use of the first coding mode
(Continued)

and/or a second indication indicative of use of the second coding mode are included in the bitstream representation according to an ordering rule.

20 Claims, 28 Drawing Sheets

Related U.S. Application Data continuation of application No. PCT/CN2019/120266, filed on Nov. 22, 2019.

(51) Int. Cl.
| | |
|---|---|
| H04N 19/159 | (2014.01) |
| H04N 19/176 | (2014.01) |
| H04N 19/186 | (2014.01) |
| H04N 19/46 | (2014.01) |
| H04N 19/82 | (2014.01) |
| H04N 19/96 | (2014.01) |

(52) U.S. Cl.
CPC ......... *H04N 19/176* (2014.11); *H04N 19/186* (2014.11); *H04N 19/46* (2014.11); *H04N 19/82* (2014.11); *H04N 19/96* (2014.11)

(58) Field of Classification Search
CPC ........ H04N 19/46; H04N 19/82; H04N 19/96; H04N 19/70; H04N 19/11; H04N 19/593
USPC .................................................. 375/240.02
See application file for complete search history.

(56) References Cited

U.S. PATENT DOCUMENTS

| | | | |
|---|---|---|---|
| 2013/0230110 | A1 | 9/2013 | Doron et al. |
| 2014/0294078 | A1* | 10/2014 | Seregin ................ H04N 19/503 375/240.15 |
| 2015/0264354 | A1 | 9/2015 | Zhang et al. |
| 2017/0339404 | A1 | 11/2017 | Panusopone et al. |
| 2017/0347093 | A1 | 11/2017 | Yu et al. |
| 2018/0295364 | A1 | 10/2018 | Liu et al. |
| 2018/0332284 | A1 | 11/2018 | Liu et al. |
| 2020/0244956 | A1 | 7/2020 | Lee et al. |
| 2021/0029352 | A1 | 1/2021 | Zhang et al. |

FOREIGN PATENT DOCUMENTS

| | | |
|---|---|---|
| CN | 106105203 A | 11/2016 |
| CN | 106105205 A | 11/2016 |
| CN | 108293116 A | 7/2018 |
| CN | 108322745 A | 7/2018 |
| CN | 107071432 A | 8/2018 |
| EP | 3361726 A1 | 8/2018 |
| KR | 20170110162 A | 10/2017 |
| RU | 2609094 C2 | 1/2017 |
| RU | 2647674 C1 | 3/2018 |
| RU | 2647682 C1 | 3/2018 |
| WO | 2017190288 A1 | 11/2017 |
| WO | 2017205701 A1 | 11/2017 |
| WO | 2017222326 A1 | 12/2017 |
| WO | 2018205950 A1 | 11/2018 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1001, 2018.
https://vcgit.hhi.fraunhofer.de/jvet/VVCSoftware_VTM/-/tags/VTM-3.0rc1.
ITU-T "High Efficiency Video Coding—Series H. Audiovisual and Multimedia Systems: Infrastructure of Audiovisual Services—Coding of Moving Video," Telecommunication Standardization Sector of ITU, Feb. 2018.
Van der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting: San Diego, USA, Apr. 10-20, 2018, document JVET-J1023_r2, 2018.
International Search Report and Written Opinion from International Patent Application No. PCT/CN2019/120266 dated Jan. 19, 2020 (12 pages).
International Search Report and Written Opinion from International Patent Application No. PCT/CN2019/120270 dated Jan. 31, 2020 (9 pages).
Albrecht et al. "Description of SDR, HDR, and 360° video Coding Technology Proposal by Fraunhofer HHI," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0014, 2018.
Bross et al. "CE3: Multiple Reference Line Intra Prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0283, 2018.
Bross et al. "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L1001, 2018.
Sun et al. "PCM Mode with Dual Tree Partition," Joint Video Experts Team (JVET) of ITU-T SG 16 WP 3 and ISO/IEC JTC 1/SC 29/WG 11 12th Meeting, Macao, CN Oct. 3-12, 2018. document JVET-L0209, 2018.
Extended European Search Report from European Patent Application No. 19888222.7 dated Jan. 25, 2022 (9 pages).
First Office Action from Chinese Patent Application No. 201980076377.6 dated Apr. 15, 2023.
Office Action from Russian Patent Application No. 021116881 dated Apr. 25, 2023.

\* cited by examiner

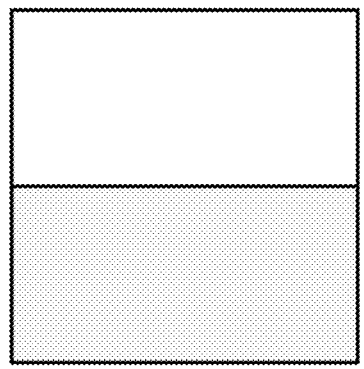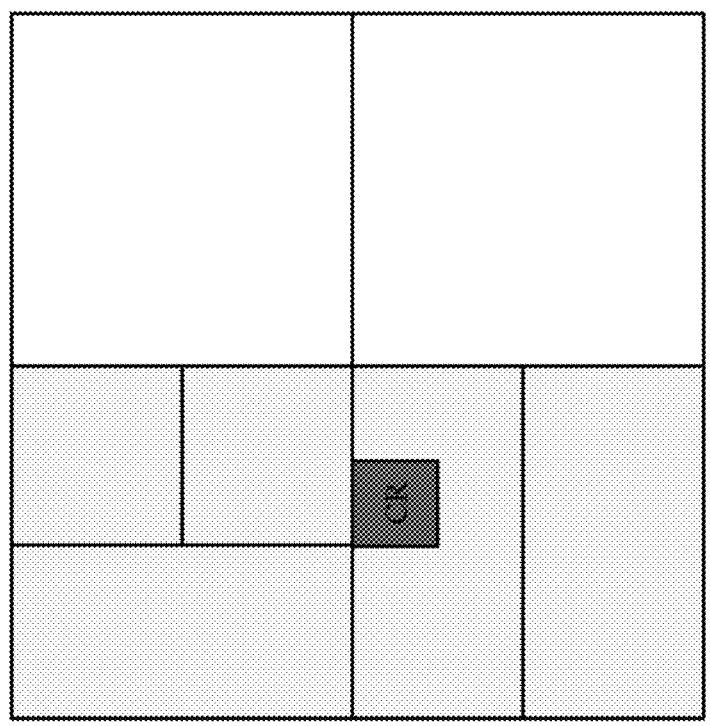
FIG. 9

2000 ─╮

2010 ─ Performing, for a current block of a video coded using a multiple reference line intra prediction (MRLIP) mode that uses a line that is non-adjacent to the current block, a conversion between the current block and a bitstream representation of the video, the MRLIP further using a most probable mode (MPM) list, and performing the conversion comprising replacing a first mode (M1) of the MPM list with a second mode (M2) of the MPM list

2110 — Performing, for a current block of a video coded using a multiple reference line intra prediction (MRLIP) mode that uses a line that is non-adjacent to the current block, a conversion between the current block and a bitstream representation of the video, the bitstream representation comprising a coded index of a mode in a fixed candidate list instead of a coded index of a mode in a most probable mode (MPM) list

PULSE CODE MODULATION TECHNIQUE IN VIDEO PROCESSING

CROSS-REFERENCE TO RELATED APPLICATION

This application is a continuation of U.S. application Ser. No. 17/071,590, filed on Oct. 15, 2020, which is a continuation of International Application No. PCT/CN2019/120266, filed on Nov. 22, 2019, which claims the priority to and benefits of International Patent Application No. PCT/CN2018/116885, filed on Nov. 22, 2018. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments during video decoding or encoding using intra prediction coding of video and images in which multiple reference lines are used.

In one example embodiment, a method of video processing is disclosed. The method includes determining, for a current block of video, that at least one of a first coding mode in which pulse code modulation (PCM) is used or a second coding mode in which multiple reference line based intra prediction (MRLIP) is used is enabled; and performing, based on the first coding mode or the second coding mode, a conversion between the current block and a bitstream representation of the video, wherein a first indication indicative of use of the first coding mode and/or a second indication indicative of use of the second coding mode are included in the bitstream representation according to an ordering rule.

In another example embodiment, a method of video processing is disclosed. The method includes determining, for a conversion between a current block of video and a bitstream representation of the video, based on a color component representation of the video, at least one flag associated with a coding mode based on a pulse code modulation of the current block; and performing, based on the determining, the conversion.

In yet another example embodiment, a method of video processing is disclosed. The method includes performing a conversion between a current block of a video region of a video and a bitstream representation of the video, wherein the bitstream representation is formatted according to a rule regarding an applicability of a pulse code modulation (PCM) to the current block, and wherein the rule specifies to omit an indication of the PCM at a current block level upon a determination that an indication of disabling the PCM is included at a video region level.

In yet another example embodiment, a method of video processing is disclosed. The method includes making a decision, based on a size of a current block of video, regarding enabling a pulse code modulation (PCM) coding mode for the current block; and performing, based on the decision, a conversion between the current block and a bitstream representation of the video.

In yet another example embodiment, a method of video processing is disclosed. The method includes determining, for a conversion between a current block of a video and a bitstream representation of the video, a minimum allowed value for a height or a width of the current block, wherein the minimum allowed value for the height is signaled or derived separately from the minimum allowed value for the width; and performing, based on the determining, the conversion.

In yet another example embodiment, a method of video processing is disclosed. The method includes configuring, upon a determination that an indication of a current block of video being coded with a pulse code modulation (PCM) coding mode is signaled in a bitstream representation of the video, a color component representation of the video; and performing, based on the configuring, a conversion between the current block and the bitstream representation.

In yet another example embodiment, a method of video processing is disclosed. The method includes determining, for a conversion between a current block of video and a bitstream representation of the video, that a wide angular mode is disabled for the conversion due to use of a non-adjacent reference line mode for the conversion; and performing, based on the determining, the conversion, wherein the non-adjacent reference line mode uses non-adjacent pixels from a reference line of the video for the conversion of the current block, and wherein the wide angular mode comprises an intra prediction direction beyond the 45 degree to −135 degree conventional angular intra prediction direction.

In yet another example embodiment, a method of video processing is disclosed. The method includes making a decision, based on a color sub-sampling format of a video for a conversion between a current block of the video and a bitstream representation of the video, regarding whether a multiple reference line (MRL) coding mode is enabled for the current block or a signaling format of one or more reference line indexes is used for the MRL coding mode; and performing, based on the decision, the conversion.

In yet another example embodiment, a method of video processing is disclosed. The method includes selecting, upon a determination that an inter-intra mode and a multiple reference line intra prediction (MRLIP) mode are enabled for a current block of video, a line or a column that is non-adjacent to the current block for an intra prediction process of the inter-intra mode; and performing, based on the line or the column, a conversion between the current block and a bitstream representation of the video.

In yet another example embodiment, a method of video processing is disclosed. The method includes performing, for a current block of a video coded using a multiple reference line intra prediction (MRLIP) mode that uses a line that is non-adjacent to the current block, a conversion between the current block and a bitstream representation of the video, wherein the MRLIP further uses a most probable mode (MPM) list, and wherein performing the conversion comprises replacing a first mode of the MPM list with a second mode of the MPM list.

In yet another example embodiment, a method of video processing is disclosed. The method includes performing, for a current block of a video coded using a multiple reference line intra prediction (MRLIP) mode that uses a line that is non-adjacent to the current block, a conversion between the current block and a bitstream representation of the video, wherein the bitstream representation comprises a coded index of a mode in a fixed candidate list instead of a coded index of a mode in a most probable mode (MPM) list.

In yet another example embodiment, a method of video processing is disclosed. The method includes determining, for a conversion between a current block of video and a bitstream representation of the video using a multiple reference line (MRL) coding mode, that the bitstream representation includes a first index corresponding to above rows used in a prediction of the current block and a second index corresponding to left columns used in the prediction; and performing, based on the determining, the conversion.

In yet another example aspect, a video encoder apparatus that includes a processor configured to implement an above-described method is disclosed.

In yet another example aspect, a video decoder apparatus that includes a processor configured to implement an above-described method is disclosed.

In yet another example aspect, a computer readable medium is disclosed. The computer readable medium has code stored on it. The code, when executed by a processor, causes the processor to implement an above-described method.

These, and other, aspects are described in the present document.

BRIEF DESCRIPTION OF THE DRAWINGS

FIG. 9 shows an example of one chroma block and its corresponding luma block.

FIGS. 11-22 are flowcharts of example methods of video processing.

DETAILED DESCRIPTION

Figure 1:
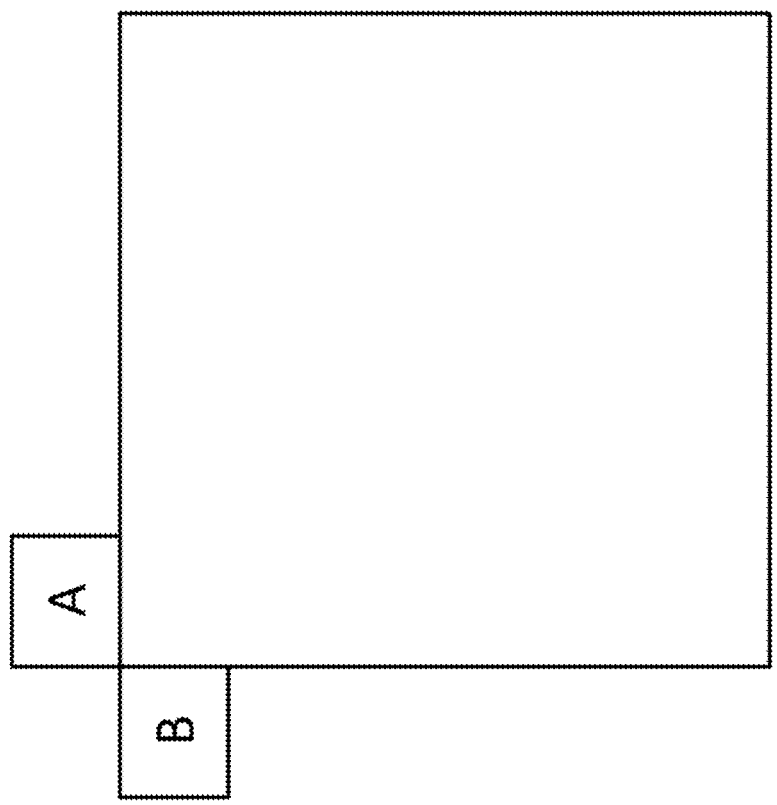
FIG. 1 shows an example of neighboring blocks used in intra mode prediction.

The present document provides various techniques that can be used by a decoder of video bitstreams to improve the quality of decompressed or decoded digital video or images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Introduction

This document is related to video coding technologies. Specifically, it is related to intra prediction, especially for multiple reference line intra prediction and pulse code modulation (PCM) in image/video coding. It may be applied to the existing video coding standard like HEVC, or the standard (Versatile Video Coding) to be finalized. It may be also applicable to future video coding standards or video codec.

2. Initial Comments

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) is found at:

http://phenix.it-sudparis.eu/jvet/doc_end_user/documents/11_Ljubljana/wg11/JVET-K1001-v7.zip The latest reference software of VVC, named VTM, could be found at:

https://vcgit.hhi.fraunhofer.de/jvet/VVCSoftware_VTM/tags/VTM-3.0rc1

2.1 Intra Prediction in HEVC/H.265

In picture two distinct kinds of redundancy can be identified: 1) Spatial or temporal redundancy, 2) Psycho-visual redundancy. For remove spatial redundancy, prediction process is used. Intra-prediction is the process to predict pixels of picture frame. Intra-picture prediction uses neighbourhood pixels for predict picture block. Before intra prediction frame must be split. In HEVC, one picture/slice/tile may be split into multiple coding tree units (CTU). Depending on the parameters like texture complexity, the CTUs can have the size: 64×64, 32×32, or 16×16. Coding Tree Unit (CTU) is therefore a coding logical unit, which is in turn encoded into an HEVC bitstream. It consists of three blocks, namely luma (Y) two chroma components (Cb and Cr). Taking 4:2:0 color format as an example, Luma component have L×L samples and each chroma component have L/2×L/2 samples. Each block is called Coding Tree Block (CTB). Each CTB has the same size (L×L) as the CTU (64×64, 32×32, or 16×16). Each CTB can be divide repetitively in a quad-tree structure, from the same size as CTB to as small as 8×8. Each block resulting from this partitioning is called Coding Blocks (CBs) and becomes the decision making point of prediction type (inter or intra prediction). The prediction type along with other parameters is coded in Coding Unit (CU). So CU is the basic unit of prediction in HEVC, each of which is predicted from previously coded data. And the CU consists of three CBs (Y, Cb and Cr). CBs could still be too large to store motion vectors (inter-picture (temporal) prediction) or intra-picture (spatial) prediction mode. Therefore, Prediction Block (PB) was introduced. Each CB can be split into PBs differently depending on the temporal and/or spatial predictability. The CTUs can have the size: 32×32, 16×16, 8×8 or 4×4.

There are two kinds of intra prediction modes, PCM (pulse code modulation) and normal intra prediction mode.

2.1.1 Pulse Code Modulation (PCM)

In I_PCM mode, prediction, transform, quantization and entropy coding are bypassed. Coding of the samples of a block by directly representing the sample values without prediction or application of a transform.

In HEVC, I_PCM mode is only available for 2N×2N PU. Max and min I_PCM CU size is signalled in SPS, legal I_PCM CU sizes are 8×8, 16×16 and 32=32, user-selected PCM sample bit-depths, signalled in SPS for luma and chroma, separately.

Take Luma sample as an example: recSamplesL[i, j]=pcm_sample_luma[(nS*j)+i]<<(BitDepthY−PCMBitDepthY). It becomes lossless coding when PCMBitDepthY=BitDepthY Syntax Design 7.3.2.2.1 General Sequence Parameter Set RBSP Syntax

|  | Descriptor |
|---|---|
| seq_parameter_set_rbsp( ) { |  |
|   sps_video_parameter_set_id | u(4) |
|   sps_max_sub_layers_minus1 | u(3) |
|   ... |  |
|   amp_enabled_flag | u(1) |
|   sample_adaptive_offset_enabled_flag | u(1) |
|   pcm_enabled_flag | u(1) |
|   if( pcm_enabled_flag ) { |  |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
|   } |  |
|   ... |  |
|   rbsp_trailing_bits( ) |  |
| } |  |

Semantics pcm_enabled_flag equal to 0 specifies that PCM-related syntax (pcm_sample_bit_depth_luma_minus1, pcm_sample_bit_depth_chroma_minus1, log 2_min_pcm_luma_coding_block_size_minus3, log 2_diff max_min_pcm_luma coding_block_size, pcm loop_filter_disabled_flag, pcm_flag, pcm alignment_zero_bit syntax elements and pcm_sample( ) syntax structure) is not present in the CVS.

NOTE 4-When MinCbLog2SizeY is equal to 6 and pcm_enabled_flag is equal to 1, PCM sample data-related syntax (pcm_flag, pcm_alignment_zero_bit syntax elements and pcm_sample( ) syntax structure) is not present in the CVS, because the maximum size of coding blocks that can convey PCM sample data-related syntax is restricted to be less than or equal to Min(CtbLog2SizeY, 5). Hence, MinCbLog2SizeY equal to 6 with pcm_enabled_flag equal to 1 is not an appropriate setting to convey PCM sample data in the CVS.

pcm_sample_bit_depth_luma_minus1 specifies the number of bits used to represent each of PCM sample values of the luma component as follows:

$$PcmBitDepth_Y = pcm\_sample\_bit\_depth\_luma\_minus1+1 \quad (7\text{-xx})$$

The value of $PcmBitDepth_Y$ shall be less than or equal to the value of $BitDepth_Y$.

pcm_sample_bit_depth_chroma_minus1 specifies the number of bits used to represent each of PCM sample values of the chroma components as follows:

$$PcmBitDepth_C = pcm\_sample\_bit\_depth\_chroma\_minus1+1 \quad (7\text{-yy})$$

The value of $PcmBitDepth_C$ shall be less than or equal to the value of $BitDepth_C$. When ChromaArrayType is equal to 0, pcm_sample_bit_depth_chroma_minus1 is not used in the decoding process and decoders shall ignore its value.

log 2_min_pcm_luma_coding_block_size_minus3 plus 3 specifies the minimum size of coding blocks with pcm_flag equal to 1.

The variable Log2MinIpcmCbSizeY is set equal to log 2_min_pcm_luma_coding_block_size_minus3+3. The value of Log2MinIpcmCbSizeY shall be in the range of Min(MinCbLog2SizeY, 5) to Min(CtbLog2SizeY, 5), inclusive.

log 2_diff_max_min_pcm_luma_coding_block_size specifies the difference between the maximum and minimum size of coding blocks with pcm_flag equal to 1.

The variable Log2MaxIpcmCbSizeY is set equal to log 2_diff max_min_pcm_luma_coding_block_size+Log2MinIpcmCbSizeY. The value of Log2MaxIpcmCbSizeY shall be less than or equal to Min(CtbLog2SizeY, 5).

pcm_loop_filter_disabled_flag specifies whether the loop filter process is disabled on reconstructed samples in a coding unit with pcm_flag equal to 1 as follows:

If pcm_loop_filter_disabled_flag is equal to 1, the deblocking filter and sample adaptive offset filter processes on the reconstructed samples in a coding unit with pcm_flag equal to 1 are disabled.

Otherwise (pcm_loop_filter_disabled_flag value is equal to 0), the deblocking filter and sample adaptive offset filter processes on the reconstructed samples in a coding unit with pcm_flag equal to 1 are not disabled.

When pcm_loop_filter_disabled_flag is not present, it is inferred to be equal to 0.

7.3.8.5 Coding Unit Syntax

|  | Descriptor |
|---|---|
| coding_unit( x0, y0, log2CbSize ) { |  |
|   if( transquant_bypass_enabled_flag ) |  |
|     cu_transquant_bypass_flag | ae(v) |
|   if( slice_type != I ) |  |
|     cu_skip_flag[ x0 ][ y0 ] | ae(v) |
|   nCbS = ( 1 << log2CbSize ) |  |
|   if( cu_skip_flag[ x0 ][ y0 ] ) |  |
|     prediction_unit( x0, y0, nCbS, nCbS ) |  |

| | Descriptor |
|---|---|
| ```
  else {
    if( slice_type != I )
      pred_mode_flag
    if( palette_mode_enabled_flag && CuPredMode[ x0 ][ y0 ] = = MODE_INTRA &&
        log2CbSize <= MaxTbLog2SizeY )
      palette_mode_flag[ x0 ][ y0 ]
    if( palette_mode_flag[ x0 ][ y0 ] )
      palette_coding( x0, y0, nCbS )
    else {
      if( CuPredMode[ x0 ][ y0 ] != MODE_INTRA ||
          log2CbSize = = MinCbLog2SizeY )
        part_mode
      if( CuPredMode[ x0 ][ y0 ] = = MODE_INTRA ) {
        if( PartMode = = PART_2Nx2N && pcm_enabled_flag &&
            log2CbSize >= Log2MinIpcmCbSizeY &&
            log2CbSize <= Log2MaxIpcmCbSizeY )
          pcm_flag[ x0 ][ y0 ]
        if( pcm_flag[ x0 ][ y0 ] ) {
          while( !byte_aligned( ) )
            pcm_alignment_zero_bit
          pcm_sample( x0, y0, log2CbSize )
        } else {
          pbOffset = ( PartMode = = PART_NxN ) ? ( nCbS / 2 ) : nCbS
          for( j = 0; j < nCbS; j = j + pbOffset )
            for( i = 0; i < nCbS; i = i + pbOffset )
              prev_intra_luma_pred_flag[ x0 + i ][ y0 + j ]
          for( j = 0; j < nCbS; j = j + pbOffset )
            for( i = 0; i < nCbS; i = i + pbOffset )
              if( prev_intra_luma_pred_flag[ x0 + i ][ y0 + j ] )
                mpm_idx[ x0 + i ][ y0 + j ]
              else
                rem_intra_luma_pred_mode[ x0 + i ][ y0 + j ]
          if( ChromaArrayType = = 3 )
            for( j = 0; j < nCbS; j = j + pbOffset )
              for( i = 0; i < nCbS; i = i + pbOffset )
                intra_chroma_pred_mode[ x0 + i ][ y0 + j ]
          else if( ChromaArrayType != 0 )
            intra_chroma_pred_mode[ x0 ][ y0 ]
        }
      } else {
...
      }
      if( !pcm_flag[ x0 ][ y0 ] ) {
        if( CuPredMode[ x0 ][ y0 ] != MODE_INTRA &&
            !( PartMode = = PART_2Nx2N && merge_flag[ x0 ][ y0 ] ) )
          rqt_root_cbf
        if( rqt_root_cbf ) {
          MaxTrafoDepth = ( CuPredMode[ x0 ][ y0 ] = = MODE_INTRA ?
            ( max_transform_hierarchy_depth_intra + IntraSplitFlag ) :
              max_transform_hierarchy_depth_inter )
          transform_tree( x0, y0, x0, y0, log2CbSize, 0, 0 )
        }
      }
    }
  }
}
``` | ae(v)<br><br><br>ae(v)<br><br><br><br><br>ae(v)<br><br><br><br>ae(v)<br><br>f(1)<br><br><br><br><br>ae(v)<br><br><br><br>ae(v)<br><br>ae(v)<br><br><br><br>ae(v)<br><br>ae(v)<br><br><br><br><br><br>ae(v) |

7.3.8.7 PCM Sample Syntax

| | Descriptor |
|---|---|
| ```
pcm_sample( x0, y0, log2CbSize ) {
  for( i = 0; i < 1 << (log2CbSize << 1 ); i++ )
    pcm_sample_luma[ i ]
  if( ChromaArrayType != 0 )
    for( i = 0; i < ( ( 2 << ( log2CbSize << 1 ) ) /
        ( SubWidthC * SubHeightC ) ); i++ )
      pcm_sample_chroma[ i ]
}
``` | <br><br>u(v)<br><br><br><br>u(v) |

Semantics pcm_flag[x0][y0] equal to 1 specifies that the pcm_sample( ) syntax structure is present and the transform_tree ( ) syntax structure is not present in the coding unit including the luma coding block at the location (x0, y0). pcm_flag [x0][y0] equal to 0 specifies that pcm_sample( ) syntax structure is not present. When pcm_flag[x0][y0] is not present, it is inferred to be equal to 0.

The value of pcm_flag[x0+i][y0+j] with i=1 . . . nCbS−1, j=1 . . . nCbS−1 is inferred to be equal to pcm_flag[x0][y0].

2.1.2 Normal Intra Prediction

For the luma component, there are 35 modes, including Planar, DC and 33 angular prediction modes for all block sizes. To better code these luma prediction modes, one most probable mode (MPM) flag is firstly code to indicate whether one of the 3 MPM modes is chosen. If the MPM flag is false, then the 32 rest modes are coded with fixed length coding).

The selection of the set of three most probable modes is based on modes of two neighboring PUs, one left and one to the above of the current PU. Let the intra modes of left and above of the current PU be A and B, respectively wherein the two neighboring blocks are depicted in FIG. 1.

If a neighboring PU is not coded as intra or is coded with pulse code modulation (PCM) mode, the PU is considered to be a DC predicted one. In addition, B is assumed to be DC mode when the above neighboring PU is outside the CTU to avoid introduction of an additional line buffer for intra mode reconstruction.

If A is not equal to B, the first two most probable modes denoted as MPM[0] and MPM[1] are set equal to A and B, respectively, and the third most probable mode denoted as MPM[2] is determined as follows:

If neither of A or B is planar mode, MPM[2] is set to planar mode.

Otherwise, if neither of A or B is DC mode, MPM[2] is set to DC mode.

Otherwise (one of the two most probable modes is planar and the other is DC), MPM[2] is set equal to angular mode 26 (directly vertical).

If A is equal to B, the three most probable modes are determined as follows. In the case they are not angular modes (A and B are less than 2), the three most probable modes are set equal to planar mode, DC mode and angular mode 26, respectively. Otherwise (A and B are greater than or equal to 2), the first most probable mode MPM[0] is set equal to A and two remaining most probable modes MPM[1] and MPM[2] are set equal to the neighboring directions of A and calculated as:

MPM[1]=2+((A−2−1+32)% 32)

MPM[2]=2+((A−2+1)% 32)

where % denotes the modulo operator (i.e., a % b denotes the remainder of a divided by b).

For the chroma component, there are 5 modes, including DM, Planar, DC, Horizontal, Vertical.

2.2 Intra Prediction in VVC 2.2.1 Intra Mode Coding with 67 Intra Prediction Modes To capture the arbitrary edge directions presented in natural video, the number of directional intra modes is extended from 33, as used in HEVC, to 65. The additional directional modes are depicted as dashed arrows in FIG. 2, and the planar and DC modes remain the same. These denser directional intra prediction modes apply for all block sizes and for both luma and chroma intra predictions.

Figure 2:
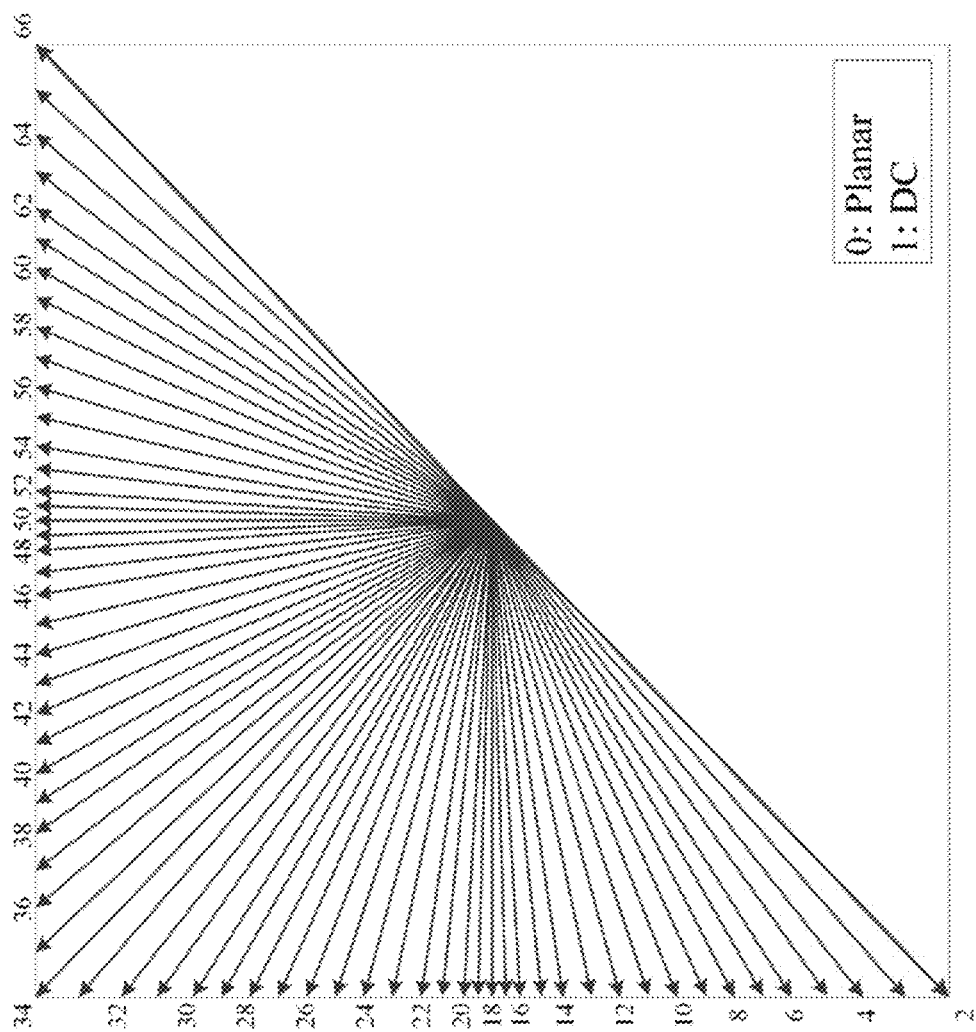
FIG. 2 shows example of 67 intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

FIG. 2 illustrate examples of 67 intra prediction modes.

2.2.2 Intra Mode Coding for Luma Component with 6 MPMs

Figure 3:
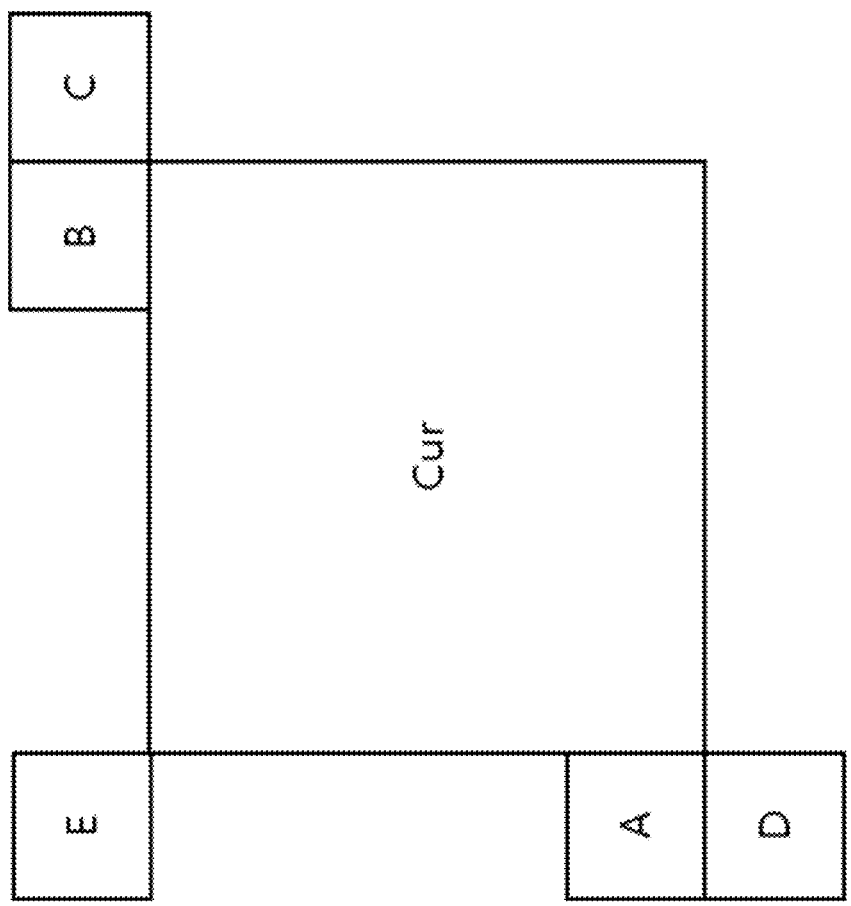
FIG. 3 illustrates an example of neighboring blocks used in a most probable mode (MPM) list construction process.

In VVC reference software VTM3.0.rc1, only intra mode of neighbor position A and B denoted as LEFT and ABOVE, as depicted in FIG. 3 are used for MPM list generation. For the non MPM coding, truncated binary coded is applied.

Let the intra modes of left and above of the current CU be $Mode_A$ and $Mode_B$, respectively.

If a neighboring CU is not coded as intra or is coded with pulse code modulation (PCM) mode, the CU is considered to be a Planar predicted one. In addition, $Mode_B$ is assumed to be Planar mode when the above neighboring CU is outside the CTU to avoid introduction of an additional line buffer for intra mode reconstruction.

The 6 MPM modes are denoted by MPM[i] (i being 0 . . . 5). The following steps are performed in order:
1. Initialized values: MPM[6]={$Mode_A$, !$Mode_A$, 50, 18, 46, 54};
2. If $Mode_A$ is equal to $Mode_B$, the followings apply
   If $Mode_A$ is larger than 1 (non-DC/planar), MPM[6]= {$Mode_A$, planar, DC, 2+((candIntraPredModeA+ 62) % 65), 2+((candIntraPredModeA−1) % 65, 2+((candIntraPredModeA+61) % 65))};
3. Otherwise ($Mode_A$ is equal to $Mode_B$), the followings apply:
   MPM[0]=$Mode_A$, MPM[1]=$Mode_B$
   set the variable biggerIdx is as follows:
     biggerIdx=candModeList[0]>candModeList[1] ? 0:1
   If both of $Mode_A$ and $Mode_B$ are larger than 1, MPM[x] with x=2.5 is derived as follows:
     MPM[2]=INTRA_PLANAR
     MPM[3]=INTRA_DC
   If MPM[biggerIdx]−MPM[! biggerIdx] is equal to neither 64 nor 1, the following applies:
     MPM[4]=2+((MPM[biggerIdx]+62) % 65)
     MPM[5]=2+((MPM[biggerIdx]−1) % 65)
   Otherwise, the following applies:
     MPM[4]=2+((MPM[biggerIdx]+1) % 65)
     MPM[5]=2+(candModeList[biggerIdx] % 65)
   Otherwise, if sum of $Mode_A$ and $Mode_B$ is larger or equal to 2, the following applies:
     MPM[2]=! MPM[! biggerIdx]
     MPM[3]=2+((MPM[biggerIdx]+62) % 65)
     MPM[4]=2+((MPM[biggerIdx]−1) % 65)
     MPM[5]=2+((MPM[biggerIdx]+61) % 65)
where % denotes the modulo operator (i.e., a % b denotes the remainder of a divided by b).

2.2.3 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, i.e., 67, and the intra mode coding is unchanged.

Figure 4A:
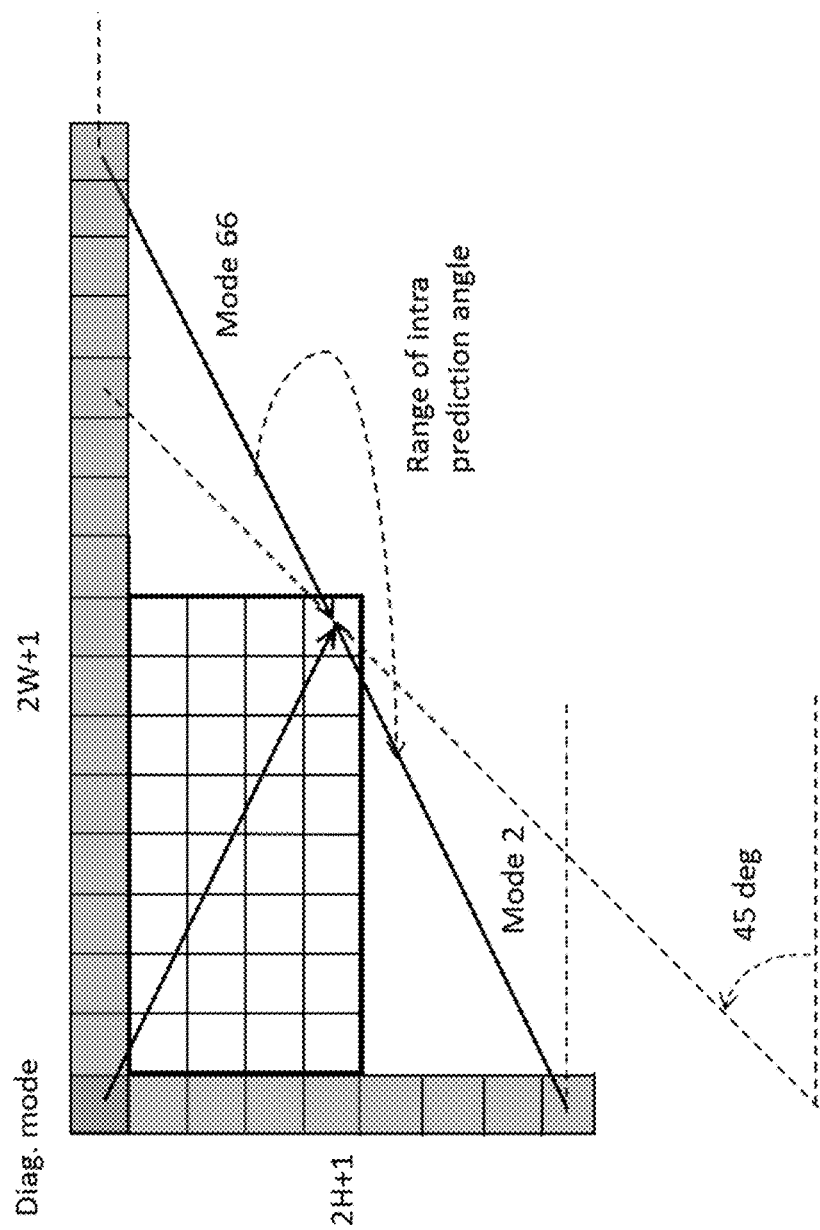
FIGS. 4A and 4B shows examples of reference samples for wide-angular intra prediction.
Figure 4B:
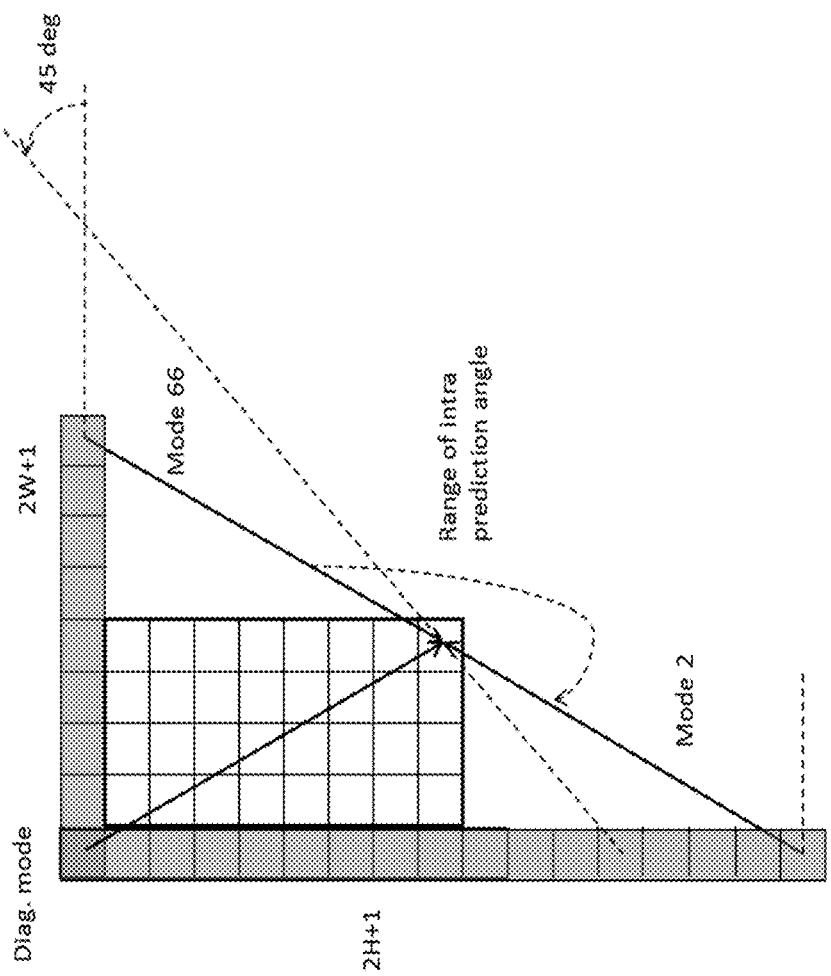

To support these prediction directions, the top reference with length 2W+1, and the left reference with length 2H+1, are defined as shown in FIG. 4.

The mode number of replaced mode in wide-angular direction mode is dependent on the aspect ratio of a block. The replaced intra prediction modes are illustrated in Table 1.

TABLE 1

Intra prediction modes replaced by wide-angular modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == ½ | Modes 61, 62, 63, 64, 65, 66 |
| H/W < ½ | Mode 57, 58, 59, 60, 61, 62, 63, 64, 65, 66 |

Figure 5:
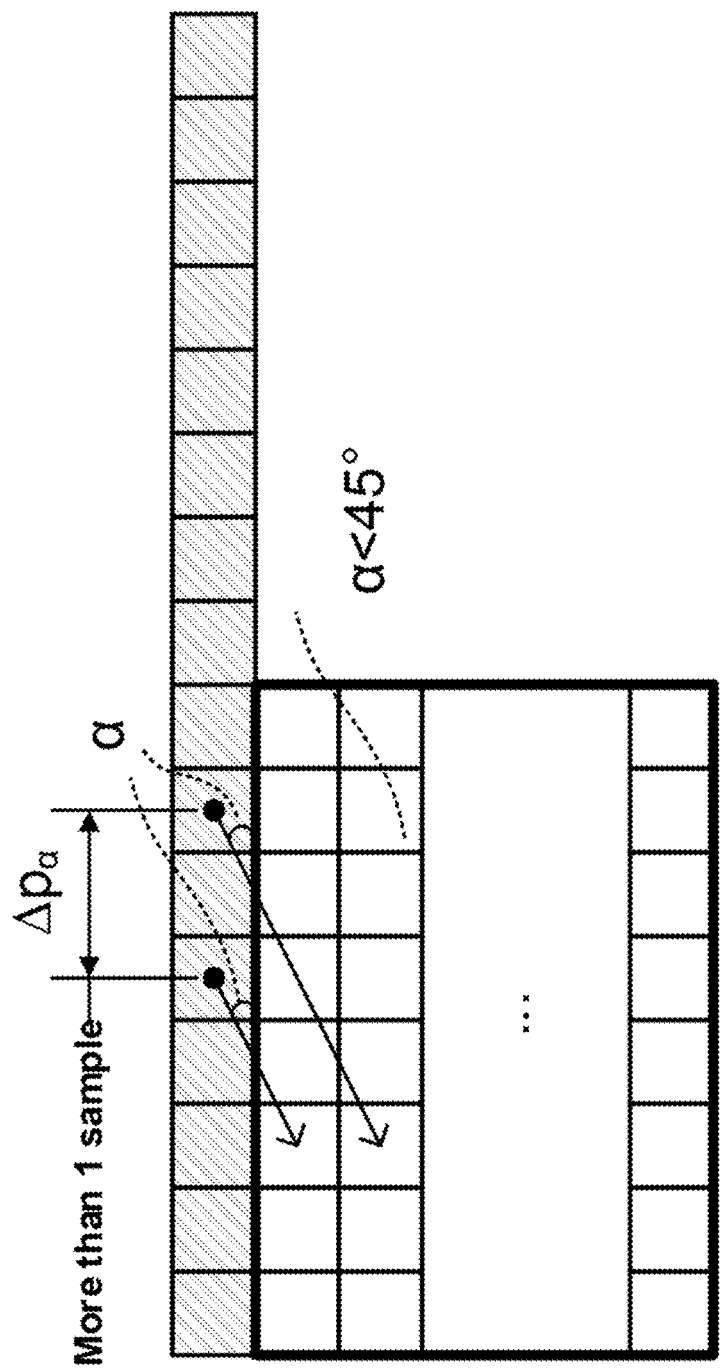
FIG. 5 illustrates an example discontinuity in case of directions beyond 45 degrees.

As shown in FIG. 5, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.2.4 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

pred(x,y)=(wL×$R_{-1,y}$+wT×$R_{x,-1}$−wTL×$R_{-1,-1}$+
(64−wL−wT+wTL)×pred(x,y)+32)>>6 where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIGS. 6A-6D illustrates the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ i is given by: x=x'+y'+1, and the coordinate y of the reference sample $R_{-1,y}$ is similarly given by: y=x'+y'+1.

Figure 6A:
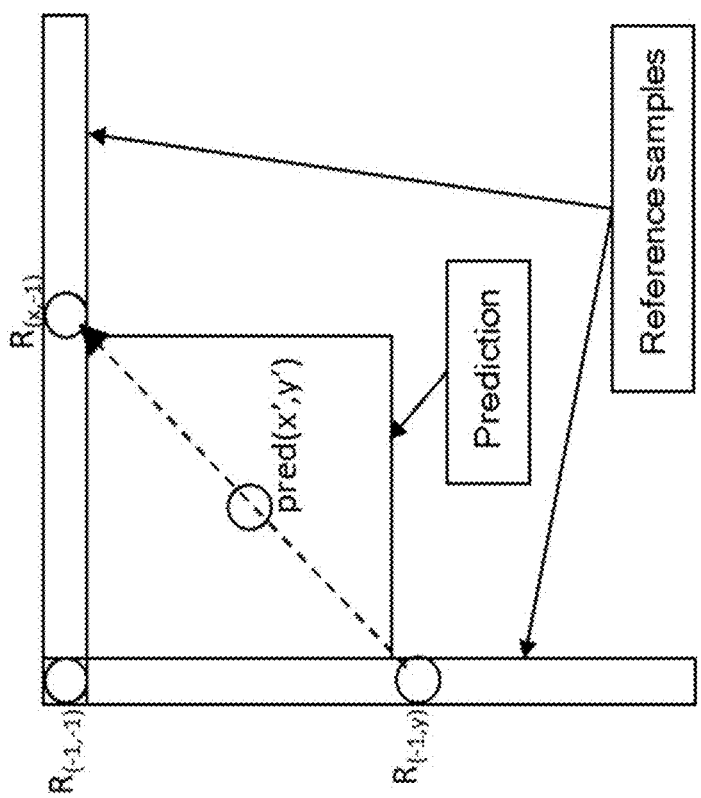
FIG. 6A-6D illustrate examples of samples used in position dependent intra prediction.
Figure 6B:
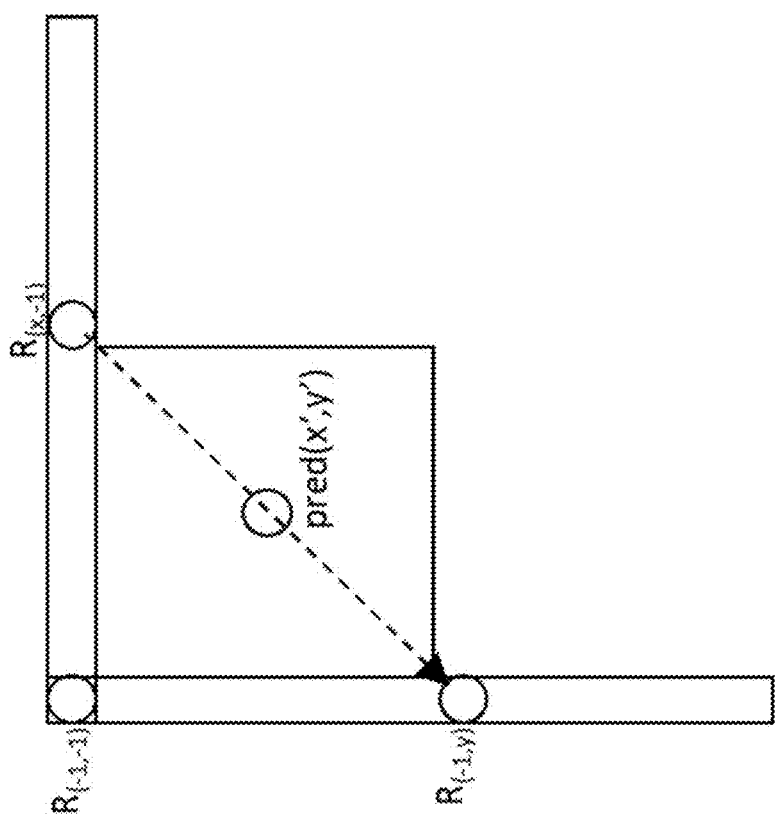
Figure 6C:
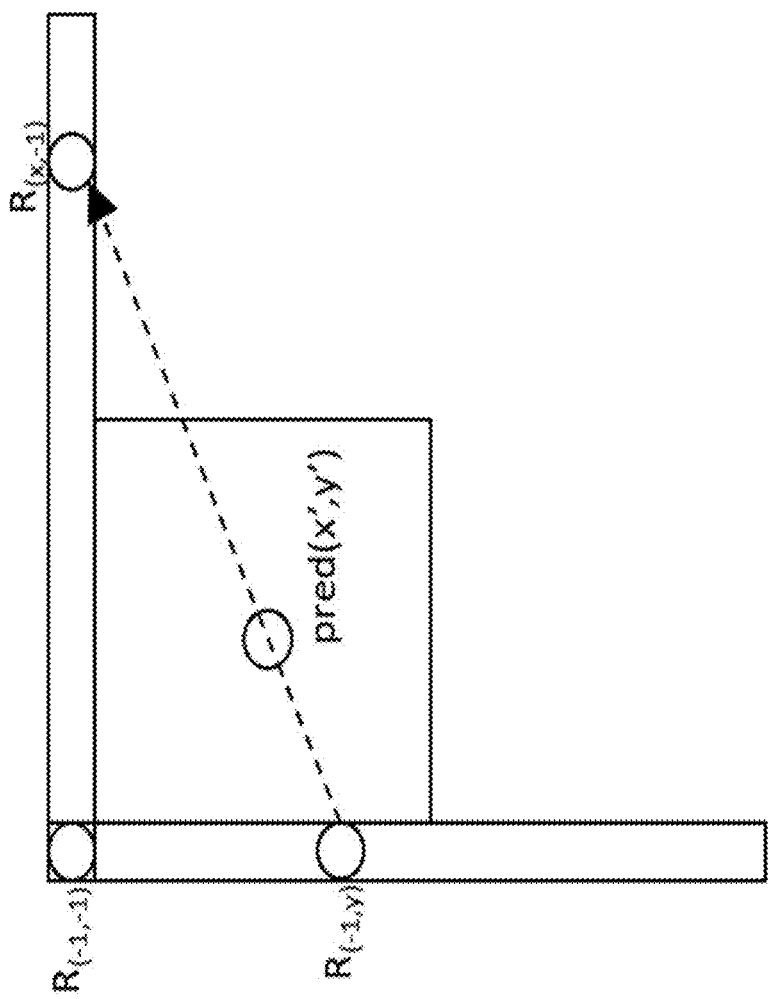
Figure 6D:
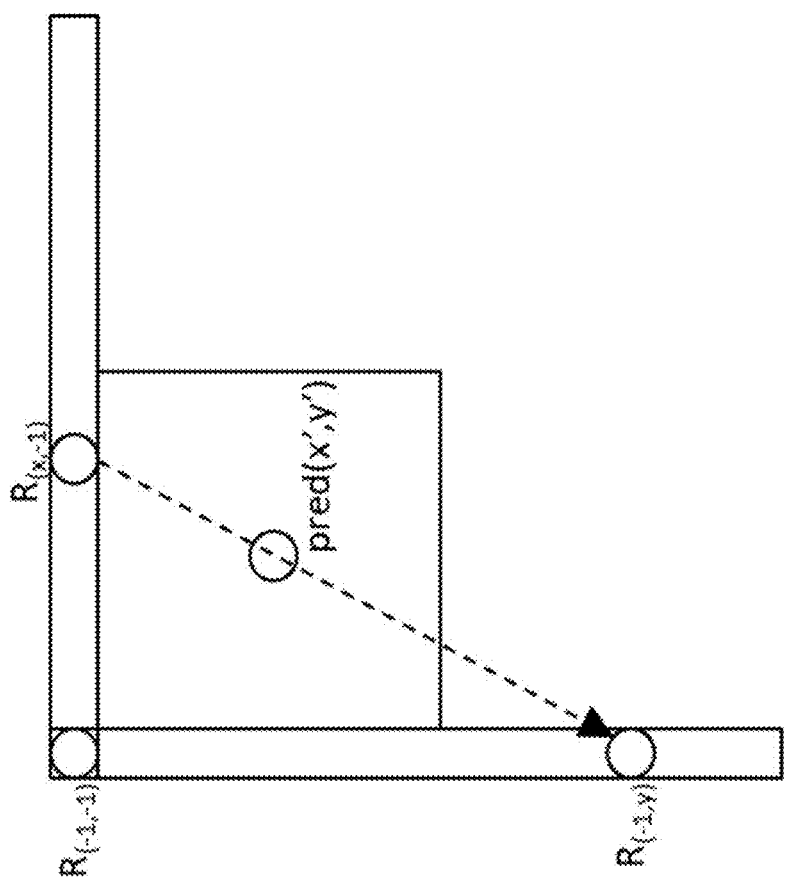

FIGS. 6A-6D show example definition of samples used by PDPC applied to diagonal and adjacent angular intra modes. FIG. 6A shows diagonal top-right mode. FIG. 6B shows diagonal bottom-left mode. FIG. 6C shows adjacent diagonal top-right mode. FIG. 6D shows an example of adjacent bottom-left mode.

The PDPC weights are dependent on prediction modes and are shown in Table 2.

TABLE 2

Example of PDPC weights according to prediction modes

| Prediction modes | wT | wL | wTL |
|---|---|---|---|
| Diagonal top-right | 16 >> (( y' << 1 ) >> shift) | 16 >> ((x' << 1 ) >> shift) | 0 |
| Diagonal bottom-left | 16 >> (( y' << 1 ) >> shift) | 16 >> ((x' << 1 ) >> shift) | 0 |
| Adjacent diagonal top-right | 32 >> (( y' << 1 ) >> shift) | 0 | 0 |
| Adjacent diagonal bottom-left | 0 | 32 >> ((x' << 1 ) >> shift) | 0 |

2.2.5 Multiple Reference Line Intra Prediction (MRLIP)

Instead of always using the reconstructed samples in the adjacent left column and above row (i.e., reference line 0) for intra prediction, it is proposed to allow using reference samples located at different distances.

Figure 7:
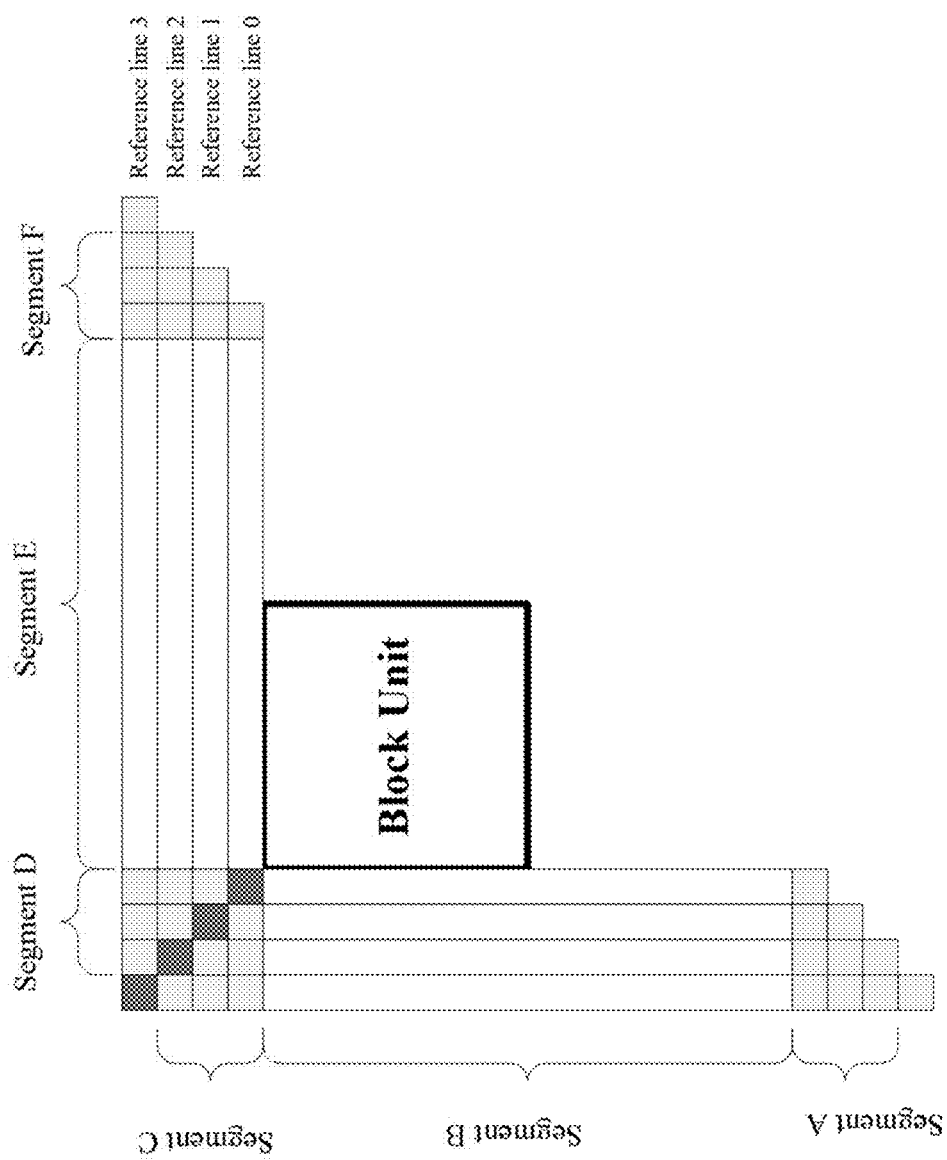
FIG. 7 shows an example of reference lines to be used for intra prediction.

The MRLIP has the following characteristics:
Reference line index signaling
  for reference line idx>0, only those in MPM list and only signal mpm index without remaining mode;
  for reference line index=0, the same as original design, all kinds of intra prediction modes may be selected
One of three lines may be selected for one luma block: reference line 0, 1, 3 as depicted in FIG. 7.
Top line of CTU restriction
  disable MRL for the first line of blocks inside a CTU 2.2.6 Chroma Coding In HEVC chroma coding, five modes (including one direct mode (DM) which is the intra prediction mode from the top-left corresponding luma block and four default modes) are allowed for a chroma block. The two color components share the same intra prediction mode.

Different from the design in HEVC, two new methods have been proposed, including: cross-component linear model (CCLM) prediction mode and multiple DMs.

2.2.6.1 CCLM

To reduce the cross-component redundancy, a cross-component linear model (CCLM) prediction mode, a.k.a. LM, is used in the JEM, for which the chroma samples are predicted based on the reconstructed luma samples of the same CU by using a linear model as follows:

$$\text{pred}_C(i,j) = \alpha \cdot \text{rec}_L'(i,j) + \beta \quad (1)$$

where $\text{pred}_C(i,j)$ represents the predicted chroma samples in a CU and $\text{rec}_L'(i,j)$ represents the downsampled reconstructed luma samples of the same CU for color formats 4:2:0 or 4:2:2 while $\text{rec}_L'(i,j)$ represents the reconstructed luma samples of the same CU for color format 4:4:4. CCLM Parameters α and β are derived by minimizing the regression error between the neighbouring reconstructed luma and chroma samples around the current block as follows:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (2)$$

$$\beta = \frac{\Sigma C(n) - \alpha \cdot \Sigma L(n)}{N} \quad (3)$$

where L(n) represents the down-sampled (for color formats 4:2:0 or 4:2:2) or original (for color format 4:4:4) top and left neighbouring reconstructed luma samples, C(n) represents the top and left neighbouring reconstructed chroma samples, and value of N is equal to twice of the minimum of width and height of the current chroma coding block. For a coding block with a square shape, the above two equations are applied directly. For a non-square coding block, the neighbouring samples of the longer boundary are first subsampled to have the same number of samples as for the shorter boundary. FIG. 6A-6D show the location of the left and above reconstructed samples and the sample of the current block involved in the CCLM mode.

This regression error minimization computation is performed as part of the decoding process, not just as an encoder search operation, so no syntax is used to convey the α and β values.

Figure 8:
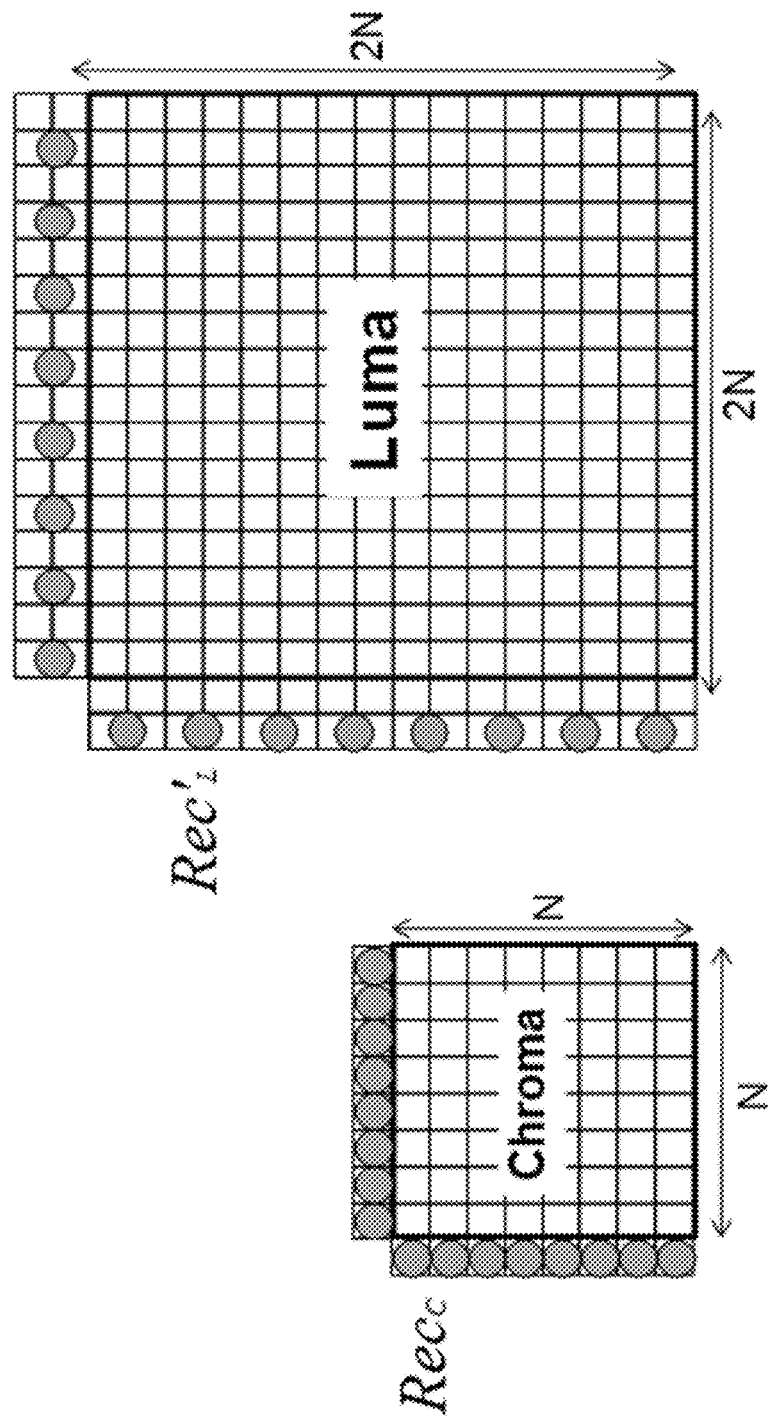
FIG. 8 shows example locations of the samples used for the derivation of $\alpha$ and $\beta$.

FIG. 8 shows example locations of the samples used for the derivation of α and β.

The CCLM prediction mode also includes prediction between the two chroma components, i.e., the Cr component is predicted from the Cb component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$\text{pred}_{Cr}(i,j) = \text{pred}_{Cr}(i,j) + \alpha \cdot \text{resi}_{Cb}'(i,j) \quad (4)$$

wherein $\text{resi}_{Cb}'(i,j)$ presents the reconstructed Cb residue sample at position (i,j).

The scaling factor α is derived in a similar way as in the CCLM luma-to-chroma prediction. The only difference is an addition of a regression cost relative to a default α value in the error function so that the derived scaling factor is biased towards a default value of −0.5 as follows:

$$\alpha = \frac{N \cdot \Sigma(Cb(n) \cdot Cr(n)) - \Sigma Cb(n) \cdot \Sigma Cr(n) + \lambda \cdot (-0.5)}{N \cdot \Sigma(Cb(n) \cdot Cb(n)) - \Sigma Cb(n) \cdot \Sigma Cb(n) + \lambda} \quad (5)$$

where Cb(n) represents the neighbouring reconstructed Cb samples, Cr(n) represents the neighbouring reconstructed Cr samples, and λ is equal to Σ(Cb(n)·Cb(n))>>9.

The CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

2.2.6.2 Chroma Coding in VVC

CCLM as in JEM is adopted in VTM-2.0. But MM-CCLM in JEM is not adopted in VTM-2.0.

Figure 10:
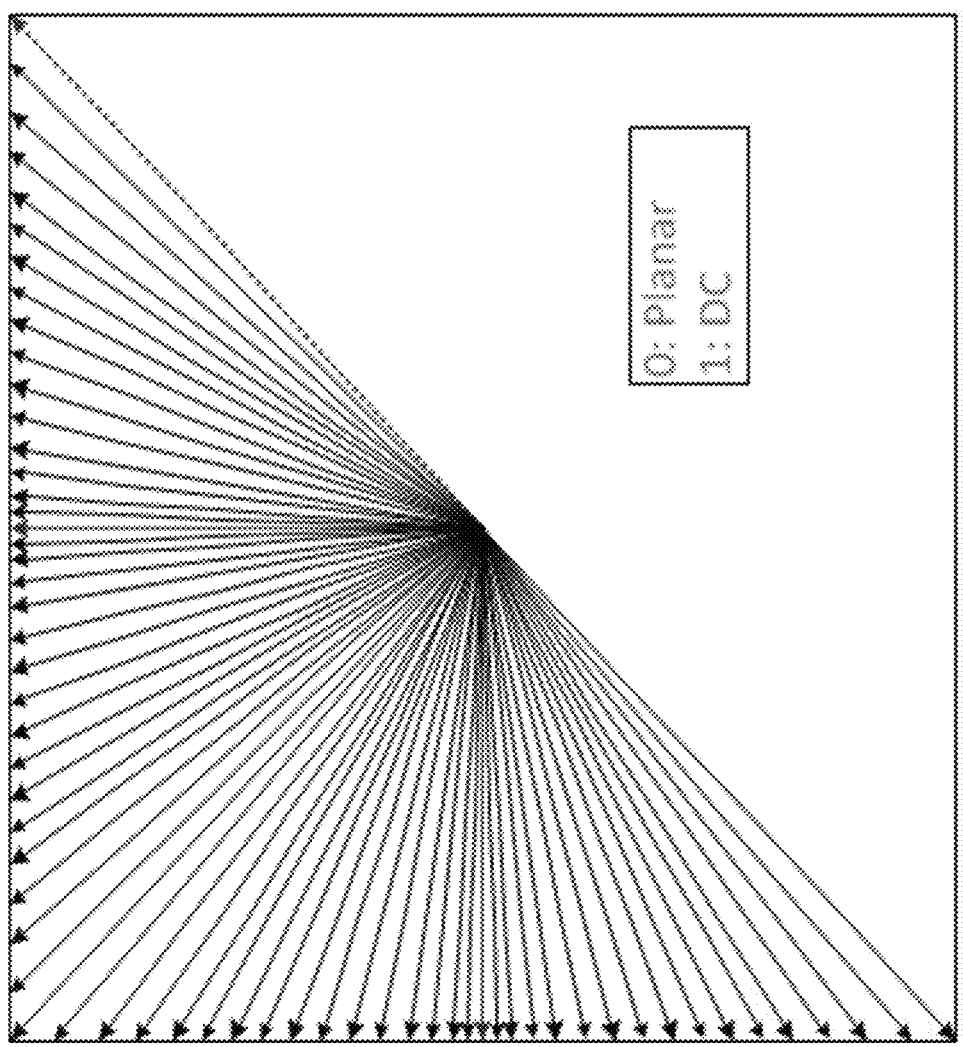
FIG. 10 shows an example of intra prediction modes with default modes.

For chroma intra coding, a candidate list of chroma intra prediction modes is firstly derived wherein three parts may be included:

one direct mode (DM) which is set to the one intra luma prediction mode associated with luma CB covering the co-located center position (CR in FIG. 9) of a chroma block; An example was shown in FIG. 9 with the co-located position denoted by TL.

one cross-component linear model (CCLM) mode four default modes (DC, Planar, Horizontal, and Vertical modes, as highlighted in FIG. 1). If one of the four default modes is identical to the DM mode, it is replaced by the intra prediction mode with largest mode index, i.e., indicated by the dashed line depicted in FIG. 10.

3. Drawbacks of Existing Embodiments

In the current design of MRL intra prediction in VVC, it has the following problems.

1) In VTM3.0-rc1, PCM flag is coded after the index of reference line used for intra prediction process. Therefore, even PCM may be used for coding one block, the reference line index is still signalled which wastes bits since normal intra prediction is disallowed for PCM coded blocks.

2) Adaptive loop filter (ALF) is newly adopted by VVC. How to handle it with PCM is unknown.

3) One PCM flag of a luma block and two corresponding chroma blocks is used in the decision of filtering process in HEVC. However, when separate tree is utilized, samples of a luma block and samples of chroma component may choose to different PCM flags, that is, one luma block may be coded with PCM and the corresponding chroma block may be coded with non-PCM, therefore, using one PCM flag in the filtering decision process is undesirable.

4) MRLIP is only applied to luma component. However, for chroma components, it may also work, especially for 4:4:4 color format.

5) MRLIP could not be applied to inter-intra coded blocks which may decrease the coding performance.

6) Reference lines with non-zero indices are more efficient for angular modes. Modes in the MPM list are utilized when the reference line index is larger than 0. However, it is possible that DC/planar mode may be included in the MPM list for which MRLIP is less efficient.

7) In HEVC, the smallest CU size is 8×8 while in VVC, the smallest CU size is 4×4. Therefore, 4×4, 4×8, 8×4 block should also apply PCM mode while it is not allowed now. In addition, original design of PCM only takes care of square CUs while in VVC, there are non-square CUs.

4. Example Embodiments and Techniques

The detailed techniques listed below should be considered as examples to explain general concepts. These techniques should not be interpreted in a narrow way. Furthermore, these techniques can be combined in any manner.

1. It is proposed that PCM enabling flag is coded before the MRLIP mode information.
    a. In one example, if PCM is disabled for this block, the reference line index used in MRLIP is further signalled.
    b. In one example, if PCM is enabled for this block, signalling of the reference line index used in MRLIP is skipped.
    c. Alternatively, PCM flag is not signaled if MRLIP mode information is equal or unequal to 0.
2. When one block is coded with the PCM mode, adaptive loop filter (ALF) for this block is disabled automatically.
    a. The signalling of ALF enable/disable flag may depend on the PCM enabling/disabling flag. Alternatively, the signalling of PCM enable/disable flag may depend on the ALF enabling/disabling flag.
   b. If one block with size equal to CTU size, the PCM flag may be firstly signalled before ALF enabling/disabling flag. When the PCM flag is true, ALF flag is not signalled any more.
   c. If one block with size equal to CTU size, the PCM flag may be firstly signalled before SAO enabling/disabling flags. When the PCM flag is true, SAO flag is not signalled any more.
   d. Alternatively, furthermore, above methods may be applied only when pcm_loop_filter_disabled_flag is equal to 1
3. How to signal/interpret/use PCM enabling/disabling flags may depend on color components.
   a. In one example, how to signal/interpret/use PCM enabling/disabling flags may depend on whether separate partition tree structure for different color components is used.
   b. In one example, when separate partition tree structure for luma and chroma components is applied, a first flag for a luma block may be signalled and a second flag for a chroma block may be signalled independently.
   c. In one example, when separate partition tree structure for the three color components is applied, three flags may be signalled independently.
   d. In one example, depending on color component, the PCM enabling/disabling flag is interpreted as different variables, e.g. pcm_luma and pcm_chroma, to control following video coding process.
   e. In the filtering process (such as deblocking filter, sample adaptive loop filter, adaptive loop filter), whether one block of a color component should be filtered may depend on the PCM enabling/disabling flag associated with the color component.
   f. Alternatively, even separate partition tree structure is enabled, PCM flags are only signalled for the luma component, while for a chroma block, it may inherit the PCM flag from any location within one corresponding luma block (e.g., from the center position of the corresponding luma block).
   g. Alternatively, furthermore, the restriction of allowed PCM coded block size/dimension may be signalled for different color components or for luma and chroma separately.
   For example, taking 4:2:0 as an example, one 64×64 luma block (CTU size equal to 64×64) correspond to 2 32×32 chroma blocks. The luma block may be split to 4 CUs with quad-tree partition (there are four 32×32 luma CUs). In original design, there is no separate tree, only one flag for each of the 32'32 luma CU is coded and it is used for the corresponding 16×16 Cb/Cr blocks since luma and chroma share the same partition structure. In total, 4 flags may be coded. In one example embodiment of our proposed method, if separate tree is applied, then the chroma blocks may be split to 2 CUs with binary-tree partition (there are two 32×16 Cb CUs, and two 32×16 Cr CUs). In this case, four flags of the four 32×32 luma blocks; and 2 flags of the 2 32×16 chroma blocks may be signalled. Similarly, the original design will check a PCM flag associated with one luma and 2 chroma blocks in the filtering process while in the proposed method, the PCM flag of one luma block, and the PCM flag of one chroma block may be checked independently for the determination of filtering processes.
4. It is proposed that a flag is signaled in a high-level (compared to the CU/block level) to indicate whether PCM is applicable or not. If PCM is not applicable, signalling of PCM enabling/disabling flag in lower-level (such as block-level) is always skipped for all blocks. The flag may be signaled in VPS/PPS/picture header/slice header/tile group header/tile/CTU row/CTU 5. When one block is coded with non-adjacent reference line (e.g., reference line index>0), wide angular mode may be automatically disabled.
   a. In one example, the mapping between signalled modes and the indexes of wide angular modes after parsing is skipped.
   b. Alternatively, wide angular mode is used with the adjacent reference line regardless the signalled reference line index.
6. Whether to enable MRL and how to transmit reference line index may depend on the color sub-sampling format.
   a. In one example, for 4:4:4 color format, MRL may be enabled for all three color components.
   b. The reference line index may be coded once for all color components of one block.
   c. Alternatively, two reference line indices may be coded wherein one is for the luma color component (e.g., $1^{st}$ color component to be coded) and one for the other two color components.
   d. Alternatively, three reference line indices may be coded wherein one is for the luma color component (e.g., $1^{st}$ color component to be coded) and other two for the other two color components
   e. Alternatively, when multiple reference line indices need to be coded, predictive coding may be applied to code the index differences.
   f. Alternatively, when multiple reference line indices need to be coded, one flag may be firstly signaled to tell all of them are the same.
   g. In one example, different color components may choose different candidate of lines.
     i. For example, Cb/Cr components may choose from the first and second neighbouring lines.
     ii. The MRL information may be coded in different ways for different colour components.
7. Inter-intra mode and MRLIP mode may be both enabled for one block. In this case, the intra prediction process used in the inter-intra mode may rely one a line/column not adjacent to the current block.
   a. In one example, if the current block is coded Inter-Intra mode, reference line indices may be further signalled.
   b. Such method is applied to certain block dimension, locations.
   c. Whether this joint mode is enabled or disabled may be signalled in SPS/VPS/PPS/picture header/slice header/tile group header/CTUs.
8. When MRLIP refers to a non-adjacent (e.g., reference line index>0) and the MPM list include a certain mode denoted by M1, M1 may be further replaced by another mode, denoted by M2, in the decoding process.
   a. In one example, the certain mode (with mode index K) is defined as the DC mode or the planar mode or wide angular mode or any non-angular mode.
   b. The mode used a replacement may be derived from remaining modes in the MPM list.

i. In one example, the first mode with index unequal to K may be utilized to derive the replacement mode, e.g., with index equal to (the first mode plus M) wherein M, e.g., is set to 1.
ii. In one example, the last mode with index unequal to K may be utilized to derive the replacement mode, e.g., with index equal to (the first mode plus M) wherein M, e.g., is set to 1.

9. When MRLIP refers to a non-adjacent (e.g., reference line index>0), instead of coding the index of an intra mode included in the MPM list, a fixed candidate list may be used and the index to the fixed candidate list may be signalled.
   a. In one example, the fixed candidate list may be set to including e.g., horizontal or vertical modes.
   b. In one example, the fixed candidate list may be pre-defined.
   c. Alternatively, the fixed candidate list may be signalled in SPS/VPS/PPS/picture header/slice header/tile group header/CTUs.
   d. Alternatively, the fixed candidate list may depend on the block dimension.
10. Instead of using the same reference line index for above rows and left columns, it is proposed that index of above rows and left columns may be signalled separately.
    a. In one example, such a method may be added as a new mode. In this case, only when this mode is enabled, separate signalling may be applied.
    b. In one example, for different combinations of reference indices of above row and left column, different sets of allowed intra prediction modes may be utilized.
    c. Different sets of intra prediction modes utilized in this method may be pre-defined or be signalled in SPS/VPS/PPS/picture header/slice header/tile group header/CTUs.
11. It is proposed to allow blocks with less than 64 samples to enable the PCM mode.
    a. In one example, 4×4, 4×8 or 8×4 may also apply PCM modes.
    b. In one example, the minimum block size with pcm_flag equal to 1 is set to (coded log 2_min_pcm_luma_coding_block_size_minus2 value plus 2).
12. It is proposed to allow blocks with more than or equal to 64*64 samples to enable the PCM mode.
    a. Alternatively, furthermore, such a method is only enabled when the LCU size is equal to 128×128.
13. It is proposed to signal the indications of maximum/minimum number of samples within one PCM-coded luma block.
    a. In one example, when signaling the indications of maximum number of samples within one PCM-coded luma block, indications of the difference between maximum and minimum values may be signalled.
    b. In one example, log 2 of the maximum/minimum number of samples within one PCM-coded luma block may be signalled.
    c. In one example, when signaling the maximum number of samples within one PCM-coded luma block, the log 2 value of the difference between maximum and minimum values may be signalled.
14. Minimum allowed size of block width and/or block height may be signalled/derived separately which could be unequal to each other.
    a. Maximum allowed block width and/or height may be signalled/derived separately.
    b. In one example, minimum allowed size of block width and block height is not signalled, it is inherited to be the same as the minimum CU block's width and height, respectively.
    c. In one example, maximum allowed size of block width and block height is not signalled, it is inherited to be the same as the LCU's width and height, respectively.
    d. Whether to signal a PCM enabling/disabling flag for block may depend on whether one of the following conditions are true:
       i. current block's width is no smaller than the minimum block width, and current block's width is no larger than the maximum allowed block width
       ii. current block's width is no smaller than the minimum block height, and current block's width is no larger than the maximum allowed block height
    e. Indications of the minimum size of block width and block height with PCM equal to 1 may be signalled separately.
    f. Indications of the maximum size of block width and block height with PCM equal to 1 may be signalled separately.
15. Different color component may have different restrictions on when the PCM flags should be signalled in block level.
    a. In one example, the allowed sizes (e.g., log 2_min_pcm_luma_coding_block_size_minus3, log 2_diff_max_min_pcm_luma_coding_block_size in 0) for different color components may be signalled separately.
    b. Whether to signal separately or just once for all color components may depend on the color sub-sampling format (e.g., 4:2:0, 4:4:4).

5. Example Embodiments

The changes compared to the implementation of VTM-3.0rc1 are highlighted in large boldface font. The deleted part is marked with strikethrough.

5.1 Embodiment #1

Semantics pcm_enabled_flag equal to 0 specifies that PCM-related syntax (pcm_sample_bit_depth_luma_minus1, pcm_sample_bit_depth_chroma_minus1, log 2_min_pcm_luma_coding_block_size_minus3, log 2_diff_max_min_pcm_luma_coding_block_size_pcm_loop_filter_disabled_flag, pcm_flag_pcm_alignment_zero_bit syntax elements and pcm_sample( ) syntax structure) is not present in the CVS.

NOTE 4—When MinCbLog2SizeY is equal to 7 and pcm_enabled_flag is equal to 1, PCM sample data-related syntax (pcm_flag, pcm_alignment_zero_bit syntax elements and pcm_sample( ) syntax structure) is not present in the CVS, because the maximum size of coding blocks that can convey PCM sample data-related syntax is restricted to be less than or equal to Min(CtbLog2SizeY, 6). Hence, MinCbLog2SizeY equal to 7 with pcm_enabled_flag equal to 1 is not an appropriate setting to convey PCM sample data in the CVS.

pcm_loop_filter_disabled_flag specifies whether the loop filter process is disabled on reconstructed samples in a coding unit with pcm_flag equal to 1 as follows:

If pcm_loop_filter_disabled_flag is equal to 1, the deblocking filter, adaptive loop filter and sample adaptive offset filter processes on the reconstructed samples in a coding unit with pcm_flag equal to 1 are disabled.

Otherwise (pcm_loop_filter_disabled_flag value is equal to 0), the deblocking filter, adaptive loop filter and sample adaptive offset filter processes on the reconstructed samples in a coding unit with pcm_flag equal to 1 are not disabled.

When pcm_loop_filter_disabled_flag is not present, it is inferred to be equal to 0.

5.2 Embodiment #2

When the MRLIP and PCM are both enabled for a sequence, the following may be applied. In this case, PCM flag is firstly coded before sending the MRL index.

Coding Unit Syntax

|  | Descriptor |
|---|---|
| coding_unit( x0, y0, cbWidth, cbHeight, treeType ) { | |
|     if( slice_type != I ) { | |
|         cu_skip_flag[ x0 ][ y0 ] | ae(v) |
|         if( cu_skip_flag[ x0 ][ y0 ] = = 0 ) | |
|             pred_mode_flag | ae(v) |
|     } | |
|     if( CuPredMode[ x0 ][ y0 ] = = MODE_INTRA ) { | |
|         if( pcm_enabled_flag && | |
|             cbWidth >= MinIpcmCbSizeX && cbWidth <= MaxIpcmCbSizeX && | |
|             cbHeight >= MinIpcmCbSizeY && cbHeight <= MaxIpcmCbSizeY ) | |
|             pcm_flag[ x0 ][ y0 ] | |
|         if( pcm_flag[ x0 ][ y0 ] ) { | |
|             //PCM related syntax | |
|         } else { | |
|             if( treeType = = SINGLE_TREE \|\| treeType = = DUAL_TREE_LUMA ) { | |
|                 if( ( y0 % CtbSizeY ) > 0 ) | |
|                     intra_luma_ref_idx[ x0 ][ y0 ] | ae(v) |
|                 if (intra_luma_ref_idx[ x0 ][ y0 ] = = 0) | |
|                 ... | |
|                 if( intra_luma_mpm_flag[ x0 ][ y0 ] ) | |
|                     intra_luma_mpm_idx[ x0 ][ y0 ] | ae(v) |
|                 else | |
|                     intra_luma_mpm_remainder[ x0 ][ y0 ] | ae(v) |
|             } | |
|             if( treeType = = SINGLE_TREE \|\| treeType = = DUAL_TREE_CHROMA ) | |
|                 intra_chroma_pred_mode[ x0 ][ y0 ] | ae(v) |
|         } | |
|     } else { /* MODE_INTER */ | |
|     ... | |
| } | |

Alternatively, the signaling of PCM flag may depend on either the required width or height satisfy the conditions.

|  | Descriptor |
|---|---|
| coding_unit( x0, y0, cbWidth, cbHeight, treeType ) { | |
|   if( slice_type != I ) { | |
|     pred_mode_flag | ae(v) |
|   } | |
|   if( CuPredMode[ x0 ][ y0 ] = = MODE_INTRA ) { | |
|   if( pcm_enabled_flag && | |
|     (cbWidth >= MinIpcmCbSizeX && | |
|     cbWidth <= MaxIpcmCbSizeX) \|\| | |
|     (cbHeight >= MinIpcmCbSizeY && | |
|     cbHeight <= MaxIpcmCbSizeY ) | |
|   pcm_flag[ x0 ][ y0 ] | ae(v) |
|   if( pcm_flag[ x0 ][ y0 ] ) { | |
|     ... //PCM related syntax elements | |
|   } else { | |
|     if( ( y0 % CtbSizeY ) > 0 ) | |
|       intra_luma_ref_idx[ x0 ][ y0 ] | ae(v) |
|     if (intra_luma_ref_idx[ x0 ][ y0 ] = = 0) | |
| ... | |
|   } | |
|   } else { /* MODE_INTER */ | |
| ... | |
|   } | |
| ... | |
| } | |

5.3 Embodiment #3

In this embodiment, PCM enabling/disabling flags may be associated with the color component.

5.3.1 Signaling of PCM Flags

The signaling of PCM enabling/disabling flag is coded separately for luma and chroma components when separate partition tree structure (a.k.a., dual tree) is used. The proposed changes are highlighted.

5.3.1.1 With Two Different Syntax Elements

|  | Descriptor |
|---|---|
| coding_unit( x0, y0, cbWidth, cbHeight, treeType ) { | |
|   if( slice_type != I ) { | |
|     pred_mode_flag | ae(v) |
|   } | |
|   if( CuPredMode[ x0 ][ y0 ] = = MODE_INTRA ){ | |
|   if( pcm_enabled_flag && | |
|     (cbWidth >= MinIpcmCbSizeX && | |
|     cbWidth <= MaxIpcmCbSizeX) \|\| | |
|     (cbHeight >= MinIpcmCbSizeY && | |
|     cbHeight <= MaxIpcmCbSizeY ) { | |
|     if( treeType = = SINGLE_TREE \|\| treeType = = DUAL_TREE_LUMA ) | |
|       pcm_flag_luma[ x0 ][ y0 ] | ae(v) |
|     else if(treeType = = DUAL_TREE_CHROMA) | |
|       pcm_flag_chroma[ x0 ][ y0 ] | |
|   if( ((treeType = = SINGLE_TREE \|\| treeType = = DUAL_TREE_LUMA) && pcm_flag_luma[ x0 ][ y0])\|\| (treeType = = DUAL_TREE_CHROMA&& pcm_flag_chroma[ x0 ][ y0 ])) { | |
|     ... //PCM related syntax elements | |
|   } else { | |
|     if( ( y0 % CtbSizeY ) > 0 ) | |
|       intra_luma_ref_idx[ x0 ][ y0 ] | ae(v) |
|     if (intra_luma_ref_idx[ x0 ][ y0 ] = = 0) | |
| ... | |
|   } | |
|   } else { /* MODE_INTER */ | |
| ... | |
|   } | |
| ... | |
| } | |

5.3.1.2 With One Different Syntax Elements but Different Semantics

|  | Descriptor |
|---|---|
| coding_unit( x0, y0, cbWidth, cbHeight, treeType ) { | |
|   if( slice_type != I ) { | |
|     pred_mode_flag | ae(v) |
|   } | |
|   if( CuPredMode[ x0 ][ y0 ] = = MODE_INTRA ){ | |
|   if( pcm_enabled_flag && | |
|     (cbWidth >= MinIpcmCbSizeX && | |
|     cbWidth <= MaxIpcmCbSizeX) \|\| | |
|     (cbHeight >= MinIpcmCbSizeY && | |
|     cbHeight <= MaxIpcmCbSizeY ) { | |
|     pcm_flag[ x0 ][ y0 ] | ae(v) |
|   if(pcm_flag[ x0 ][ y0 ])) { | |
|     ... //PCM related syntax elements | |
|   } else { | |
|     if( ( y0 % CtbSizeY ) > 0 ) | |
|     intra_luma_ref_idx[ x0 ][ y0 ] | ae(v) |
|     if (intra_luma_ref_idx[ x0 ][ y0 ] = = 0) | |
| ... | |
|     } | |
|   } else { /* MODE_INTER */ | |
| ... | |
|   } | |
| ... | |
| } | |

When separate tree is enabled, the decoded pcm_flag is assigned to pcm_flag_luma and pcm_flag_chroma separately, depending on treeType.

More sepcifically,

If dual tree is disabled, (e.g., treeType is equal to SINGLE_TREE), the decoded pcm_flag is copied to both pcm_flag_luma and pcm_flag_chroma.

Otherwise,

If the current parsing process is for the luma component, (e.g., the treeType is equal to DUAL_TREE_LUMA), the decoded pcm_flag is copied to both pcm_flag_luma Otherwise (e.g., the treeType is equal to DUAL_TREE_ LUMA), the decoded pcm_flag is copied to pcm_flag_chroma.

5.3.2 Usage of PCM Flags

The filtering process (e.g., deblocking, sample adaptive offset, ALF) may depend on the coded pcm enabling/disabling flag associated with the color components.

More specifically,

If pcm_loop_filter_disabled_flag is equal to 1 and pcm_flag_luma[$xP_0$][$yP_0$] is equal to 1, the luma sample located at ($xP_0$, $yP_0$) is not filtered.

If pcm_loop_filter_disabled_flag is equal to 1 and pcm_flag_chroma[$xP_0$][$yP_0$] is equal to 1, the chroma sample located at ($xP_0$, $yP_0$) is not filtered.

Here, some examples are given as follows:

5.3.2.1 Filtering Process for a Luma Sample in Deblocking Filter

Alternatively, the following changes may be made on top of HEVC specification:

8.7.2.5.7 Filtering process for a luma sample

When nDp is greater than 0 and one or more of the following conditions are true, nDp is set equal to 0:

pcm_loop_filter_disabled_flag is equal to 1 and pcm_flag_luma[$xP_0$][$yP_0$] is equal to 1.

cu_transquant_bypass_flag of the coding unit that includes the coding block containing the sample $p_0$ is equal to 1.

When nDq is greater than 0 and one or more of the following conditions are true, nDq is set equal to 0:

pcm_loop_filter_disabled_flag is equal to 1 and pcm_flag_luma[$xQ_0$][$yQ_0$] is equal to 1.

cu_transquant_bypass_flag of the coding unit that includes the coding block containing the sample $q_0$ is equal to 1.

5.3.2.2 Filtering Process for a Chroma Sample in Deblocking Filter

Alternatively, the following changes may be made on top of HEVC specification:

8.7.2.5.8 Filtering Process for a Chroma Sample

When one or more of the following conditions are true, the filtered sample value, $p_0'$ is substituted by the corresponding input sample value $p_0$:

pcm_loop_filter_disabled_flag is equal to 1 and pcm_flag_chroma[$xP_0$*SubWidthC][$yP_0$*SubHeightC] is equal to 1.

cu_transquant_bypass_flag of the coding unit that includes the coding block containing the sample $p_0$ is equal to 1.

palette_mode_flag of the coding unit that includes the coding block containing the sample $p_0$ is equal to 1.

When one or more of the following conditions are true, the filtered sample value, $q_0'$ is substituted by the corresponding input sample value $q_0$:

pcm_loop_filter_disabled_flag is equal to 1 and pcm_flag chroma [$xQ_0$*SubWidthC][$yQ_0$*SubHeightC] is equal to 1.

cu_transquant_bypass_flag of the coding unit that includes the coding block containing the sample $q_0$ is equal to 1.

palette_mode_flag of the coding unit that includes the coding block containing the sample $q_0$ is equal to 1.

Notes: for all above embodiments, the following may apply:

In some examples, MinIpcmCbSizeX is equal to MinIpcmCbSizeY. Alternatively, MinIpcmCbSizeX is unequal to MinIpcmCbSizeY.

In some examples, MaxIpcmCbSizeX is equal to MaxIpcmCbSizeY. Alternatively, MaxIpcmCbSizeX is unequal to MaxIpcmCbSizeY.

MinIpcmCbSizeX, MinIpcmCbSizeY, MaxIpcmCbSizeX, MaxIpcmCbSizeY may be derived from syntax elements signaled in SPS/VPS/PPS etc. al.

Figure 11:
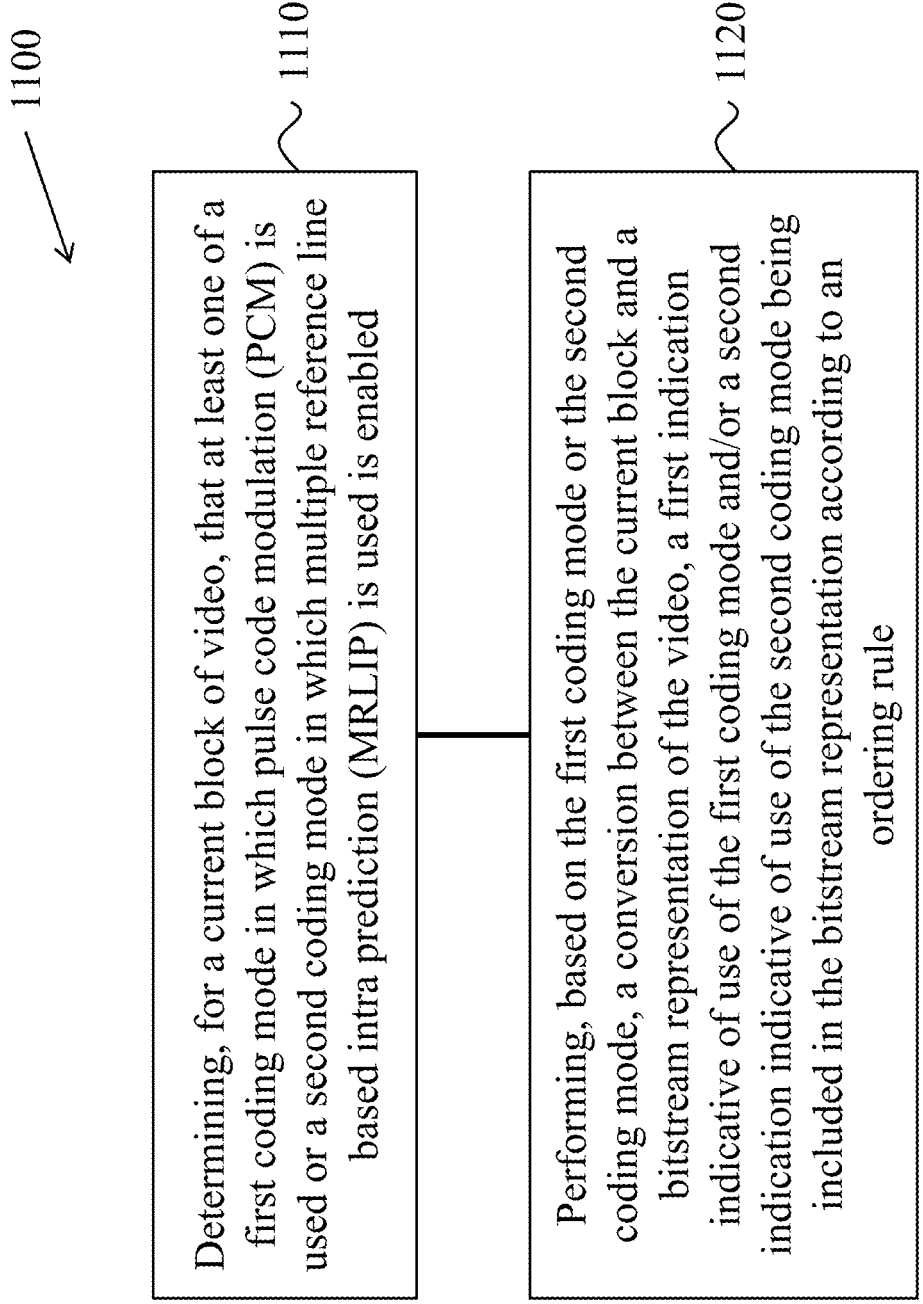

FIG. 11 is a flowchart for a method 1100 fr video processing. The method 1100 includes, at operation 1110, determining, for a current block of video, that at least one of a first coding mode in which pulse code modulation (PCM) is used or a second coding mode in which multiple reference line based intra prediction (MRLIP) is used is enabled.

The method 1100 includes, at operation 1120, performing, based on the first coding mode or the second coding mode, a conversion between the current block and a bitstream representation of the video, a first indication indicative of use of the first coding mode and/or a second indication indicative of use of the second coding mode being included in the bitstream representation according to an ordering rule.

Figure 12:
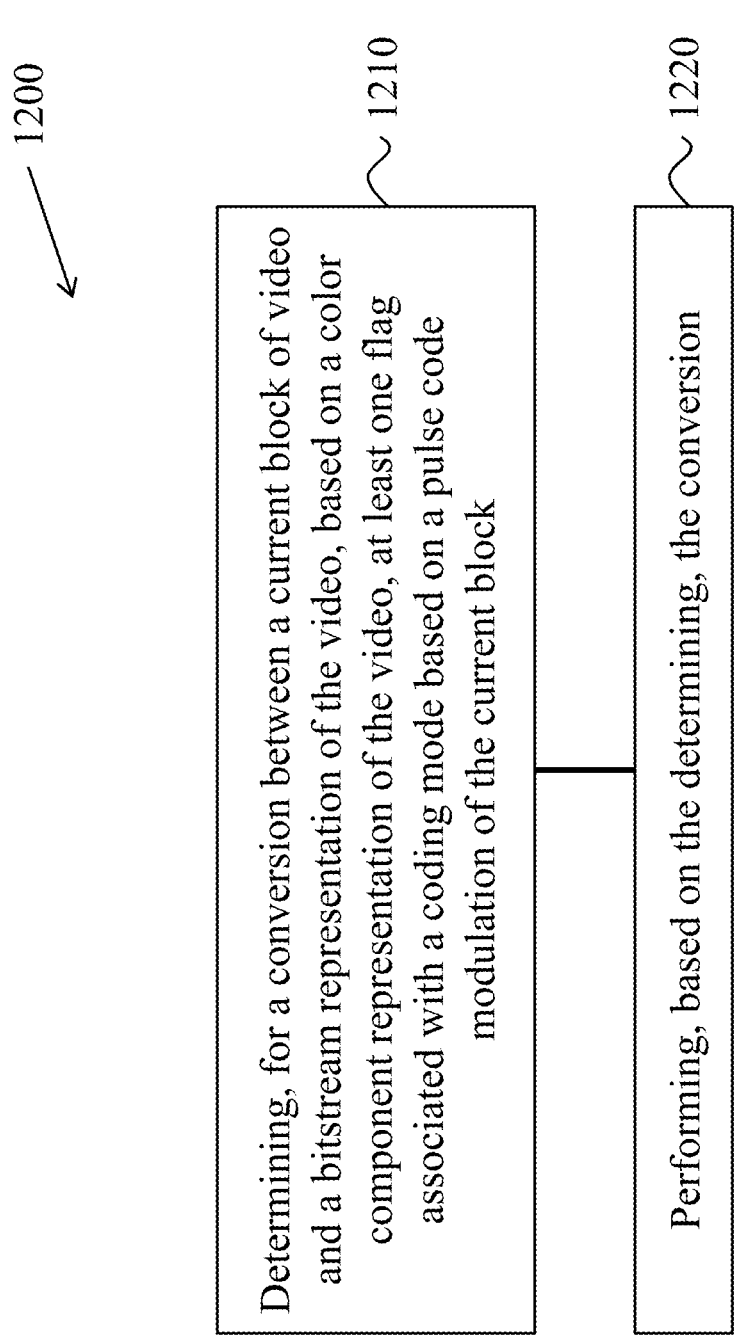

FIG. 12 is a flowchart for a method 1200 for video processing. The method 1200 includes, at operation 1210, determining, for a conversion between a current block of video and a bitstream representation of the video, based on a color component representation of the video, at least one flag associated with a coding mode based on a pulse code modulation of the current block.

The method 1200 includes, at operation 1220, performing, based on the determining, the conversion.

Figure 13:
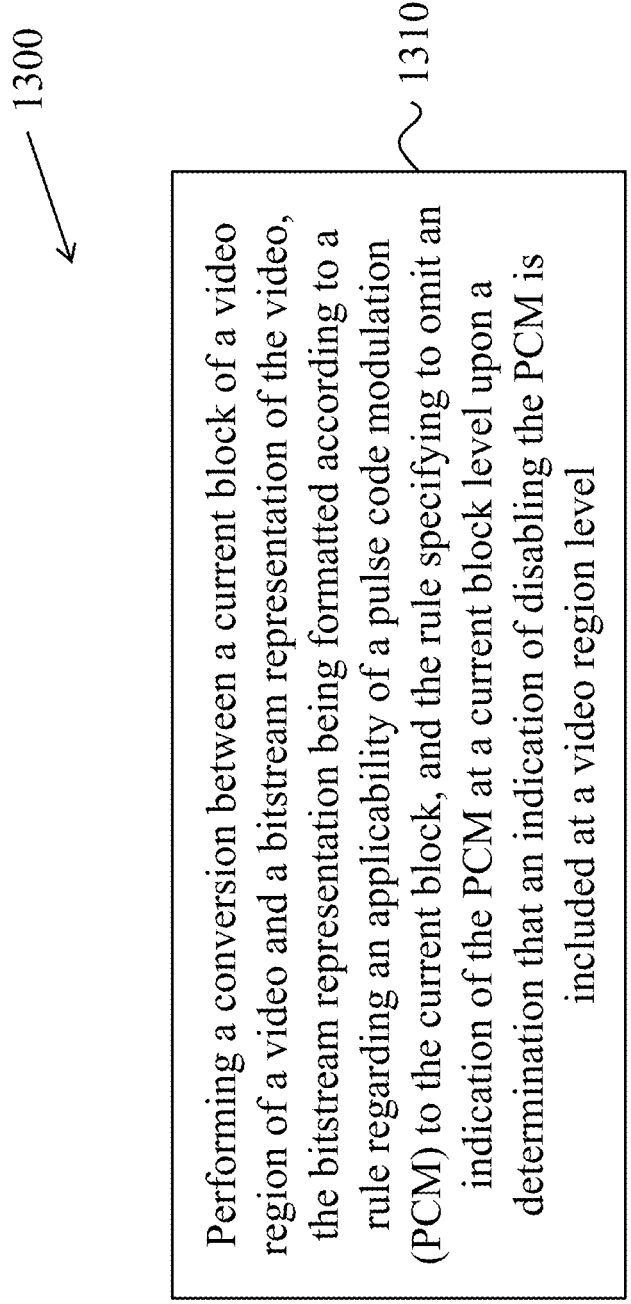

FIG. 13 is a flowchart for a method 1300 for video processing. The method 1300 includes, at operation 1310, performing a conversion between a current block of a video region of a video and a bitstream representation of the video, the bitstream representation being formatted according to a rule regarding an applicability of a pulse code modulation (PCM) to the current block, and the rule specifying to omit an indication of the PCM at a current block level upon a determination that an indication of disabling the PCM is included at a video region level.

Figure 14:
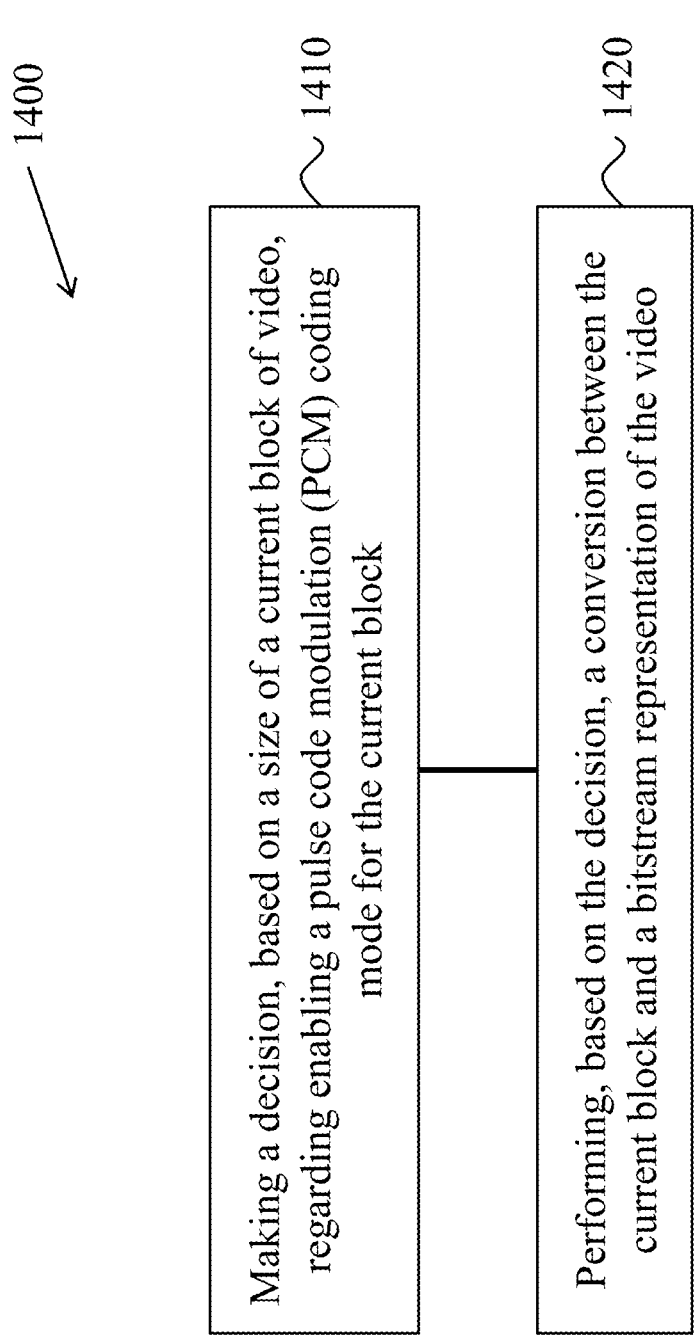

FIG. 14 is a flowchart for a method 1400 for video processing. The method 1400 includes, at operation 1410, making a decision, based on a size of a current block of video, regarding enabling a pulse code modulation (PCM) coding mode for the current block.

The method 1400 includes, at operation 1420, performing, based on the decision, a conversion between the current block and a bitstream representation of the video.

Figure 15:
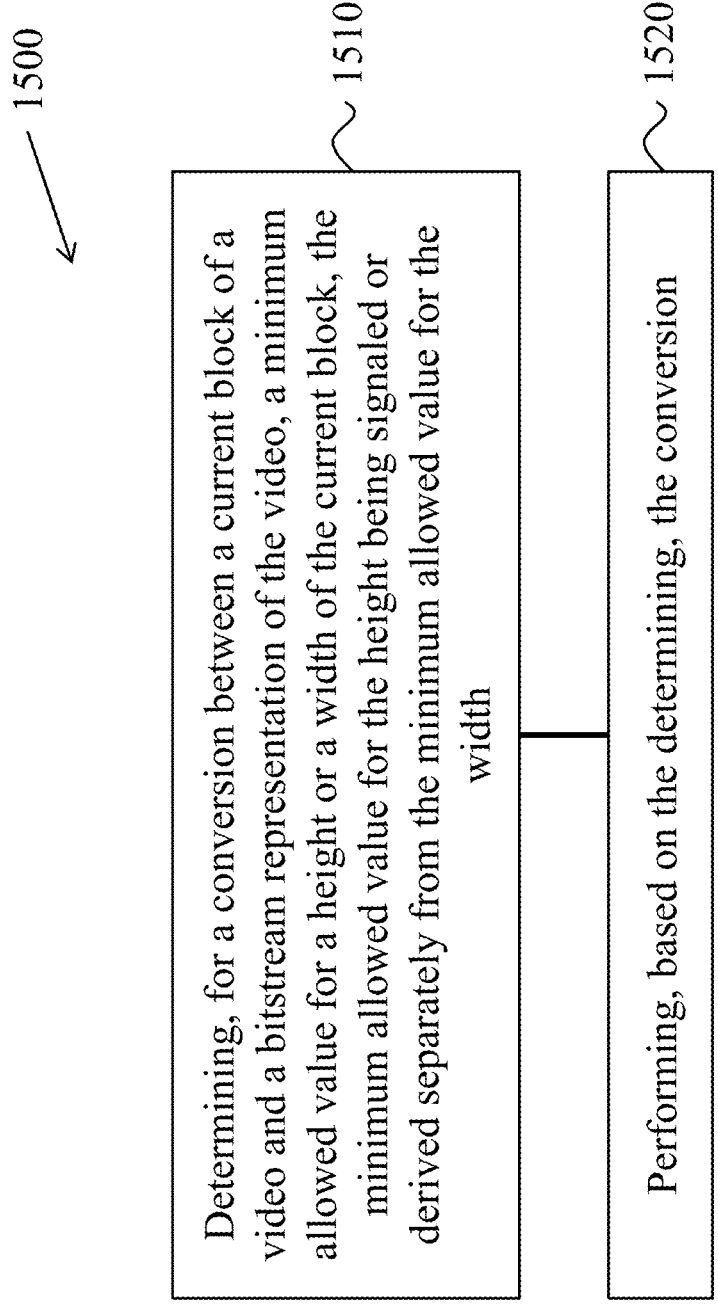

FIG. 15 is a flowchart for a method 1500 for video processing. The method 1500 includes, at operation 1510, determining, for a conversion between a current block of a video and a bitstream representation of the video, a minimum allowed value for a height or a width of the current block, the minimum allowed value for the height being signaled or derived separately from the minimum allowed value for the width.

The method 1500 includes, at operation 1520, performing, based on the determining, the conversion.

Figure 16:
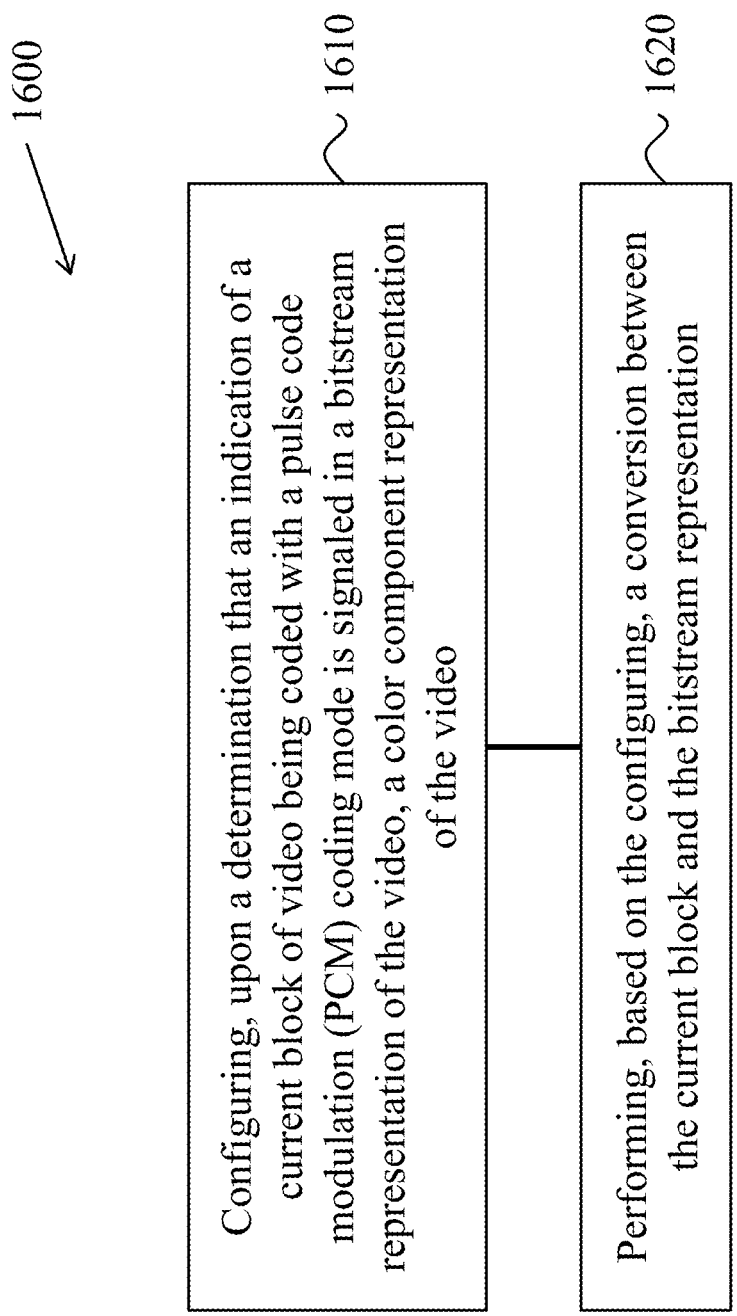

FIG. 16 is a flowchart for a method 1600 for video processing. The method 1600 includes, at operation 1610, configuring, upon a determination that an indication of a current block of video being coded with a pulse code modulation (PCM) coding mode is signaled in a bitstream representation of the video, a color component representation of the video.

The method 1600 includes, at operation 1620, performing, based on the configuring, a conversion between the current block and the bitstream representation.

Figure 17:
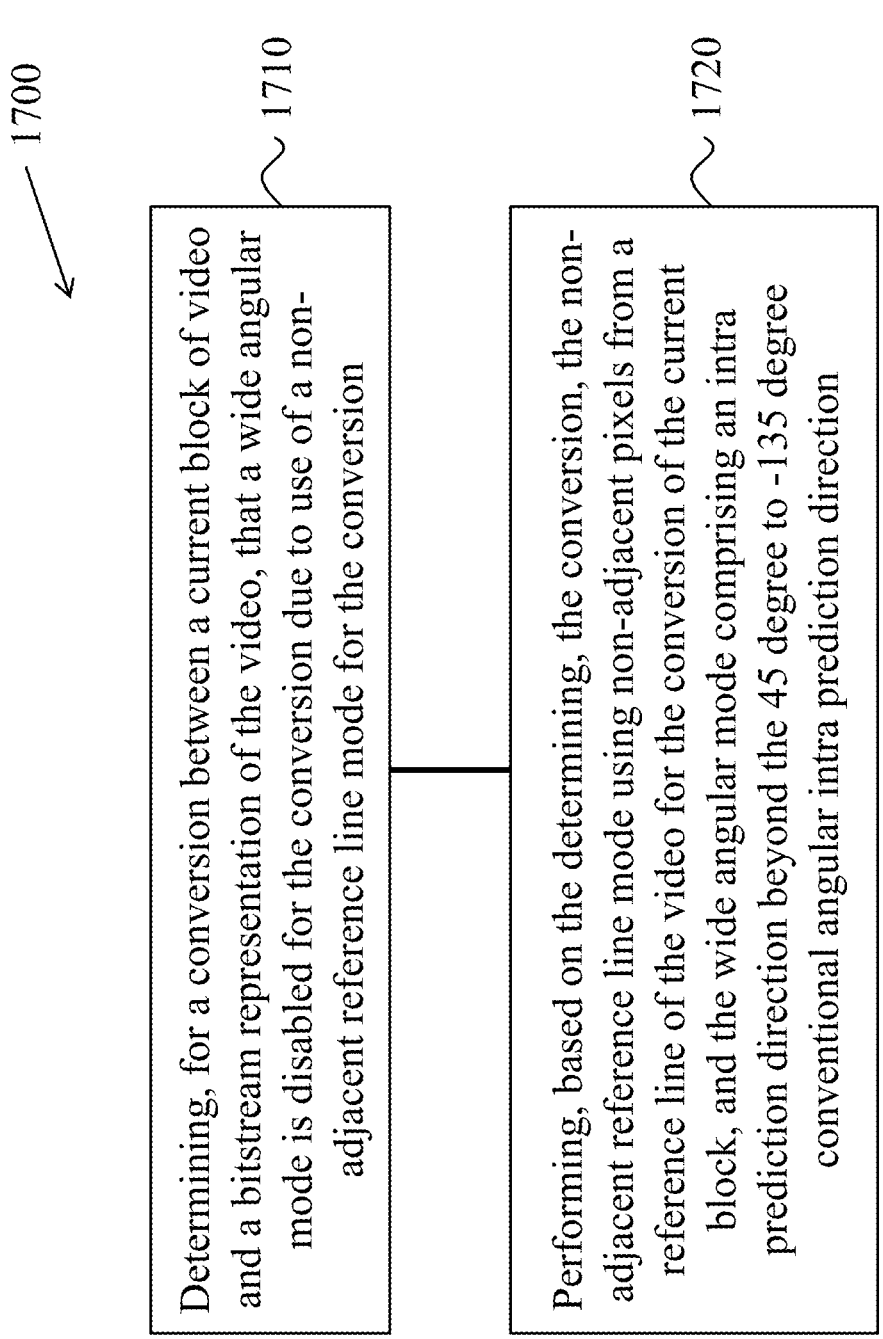

FIG. 17 is a flowchart for a method 1700 for video processing. The method 1700 includes, at operation 1710, determining, for a conversion between a current block of video and a bitstream representation of the video, that a wide angular mode is disabled for the conversion due to use of a non-adjacent reference line mode for the conversion.

The method 1700 includes, at operation 1720, performing, based on the determining, the conversion, the non-adjacent reference line mode using non-adjacent pixels from a reference line of the video for the conversion of the current block, and the wide angular mode comprising an intra prediction direction beyond the 45 degree to −135 degree conventional angular intra prediction direction.

Figure 18:
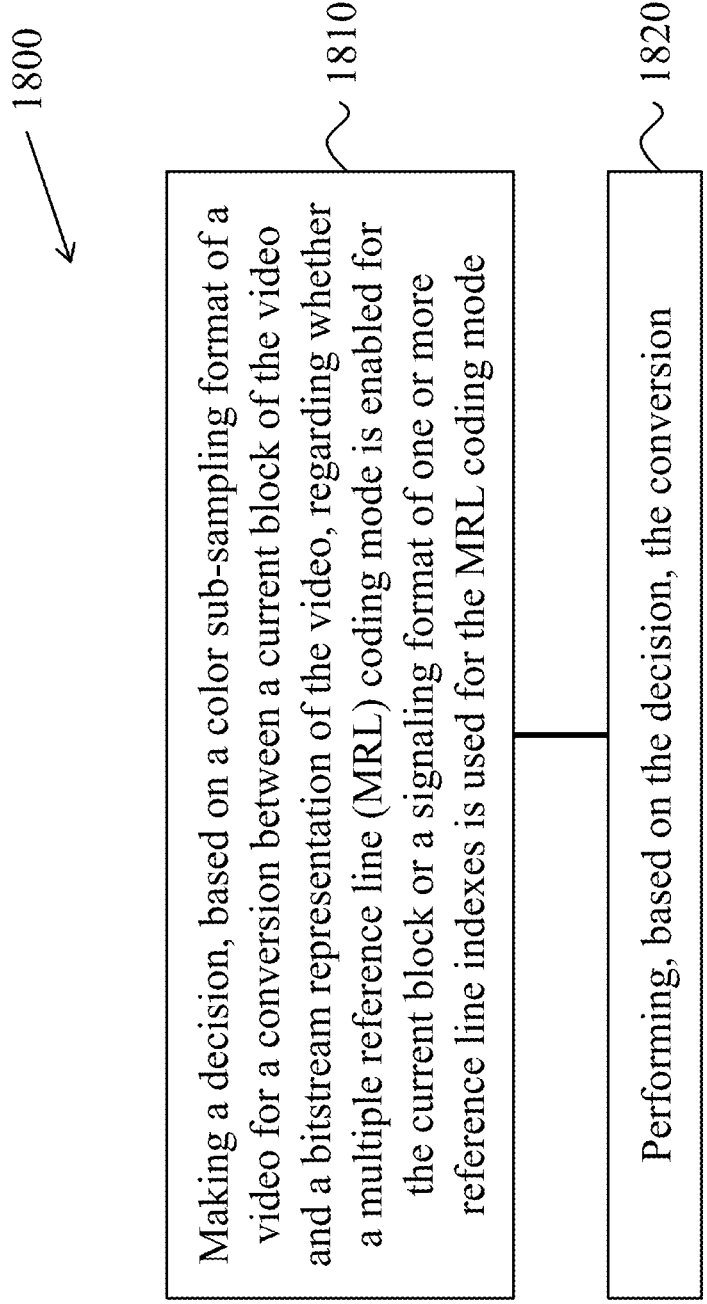

FIG. 18 is a flowchart for a method 1800 for video processing. The method 1800 includes, at operation 1810, making a decision, based on a color sub-sampling format of a video for a conversion between a current block of the video and a bitstream representation of the video, regarding whether a multiple reference line (MRL) coding mode is enabled for the current block or a signaling format of one or more reference line indexes is used for the MRL coding mode.

The method 1800 includes, at operation 1820, performing, based on the decision, the conversion.

Figure 19:
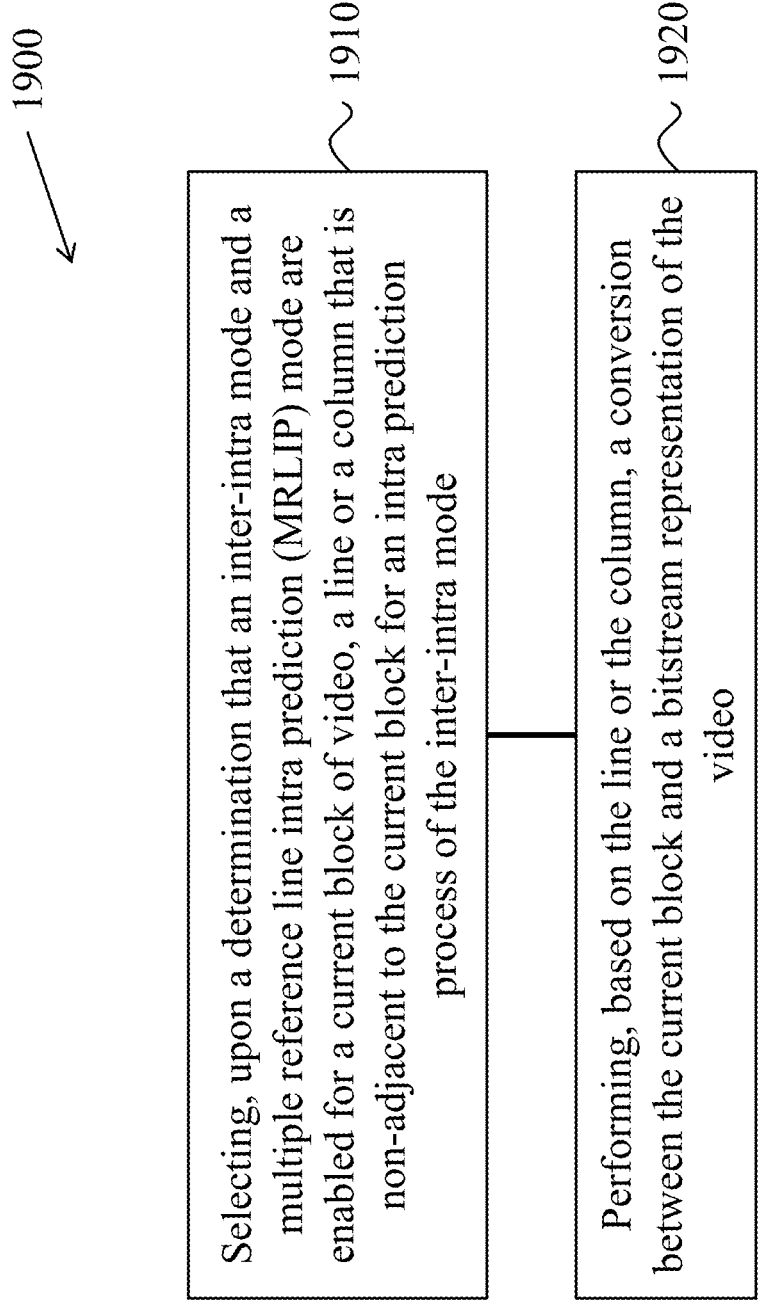

FIG. 19 is a flowchart for a method 1900 for video processing. The method 1900 includes, at operation 1910, selecting, upon a determination that an inter-intra mode and a multiple reference line intra prediction (MRLIP) mode are enabled for a current block of video, a line or a column that is non-adjacent to the current block for an intra prediction process of the inter-intra mode.

The method 1900 includes, at operation 1920, performing, based on the line or the column, a conversion between the current block and a bitstream representation of the video.

FIG. 20 is a flowchart for a method 2000 for video processing. The method 2000 includes, at operation 2010, performing, for a current block of a video coded using a multiple reference line intra prediction (MRLIP) mode that uses a line that is non-adjacent to the current block, a conversion between the current block and a bitstream representation of the video, the MRLIP further using a most probable mode (MPM) list, and performing the conversion comprising replacing a first mode (M1) of the MPM list with a second mode (M2) of the MPM list.

FIG. 21 is a flowchart for a method 2100 for video processing. The method 2100 includes, at operation 2110, performing, for a current block of a video coded using a multiple reference line intra prediction (MRLIP) mode that uses a line that is non-adjacent to the current block, a conversion between the current block and a bitstream representation of the video, the bitstream representation comprising a coded index of a mode in a fixed candidate list instead of a coded index of a mode in a most probable mode (MPM) list.

Figure 22:
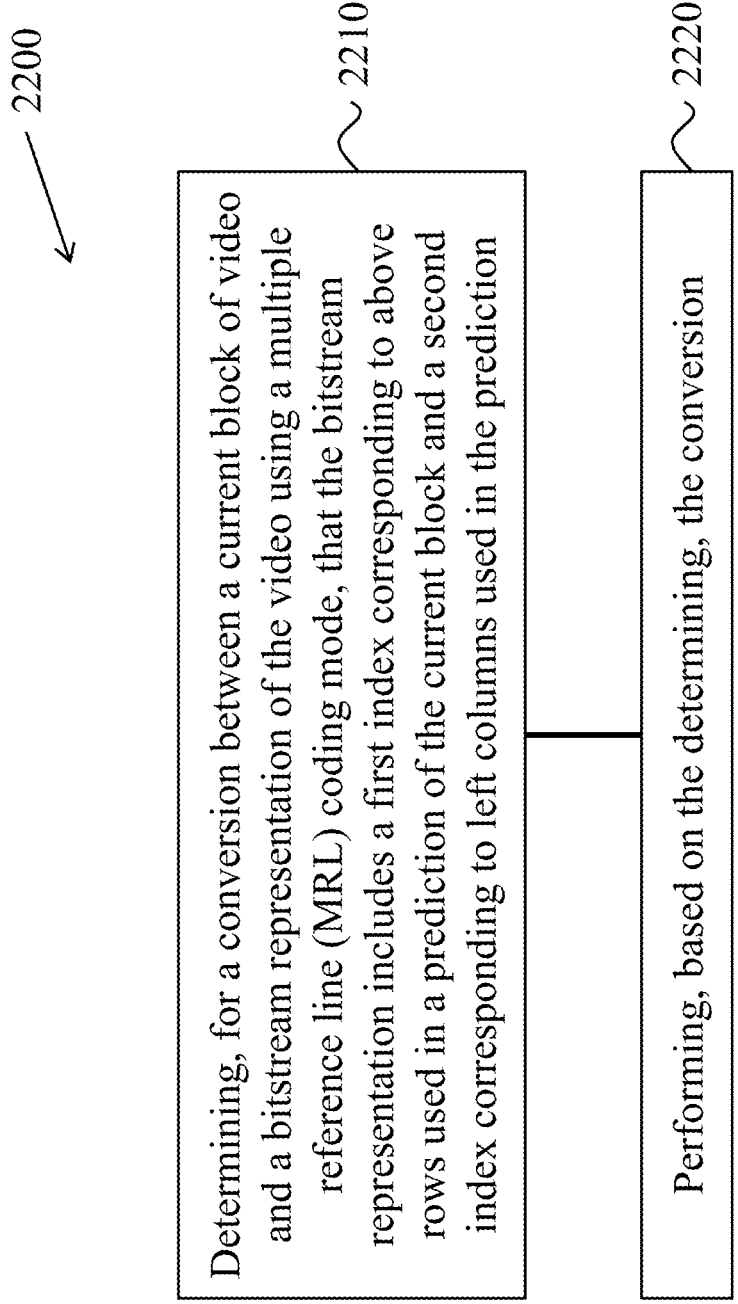

FIG. 22 is a flowchart for a method 2200 for video processing. The method 2200 includes, at operation 2210, determining, for a conversion between a current block of video and a bitstream representation of the video using a multiple reference line (MRL) coding mode, that the bitstream representation includes a first index corresponding to above rows used in a prediction of the current block and a second index corresponding to left columns used in the prediction.

The method 2200 includes, at operation 2220, performing, based on the determining, the conversion.

Figure 23:
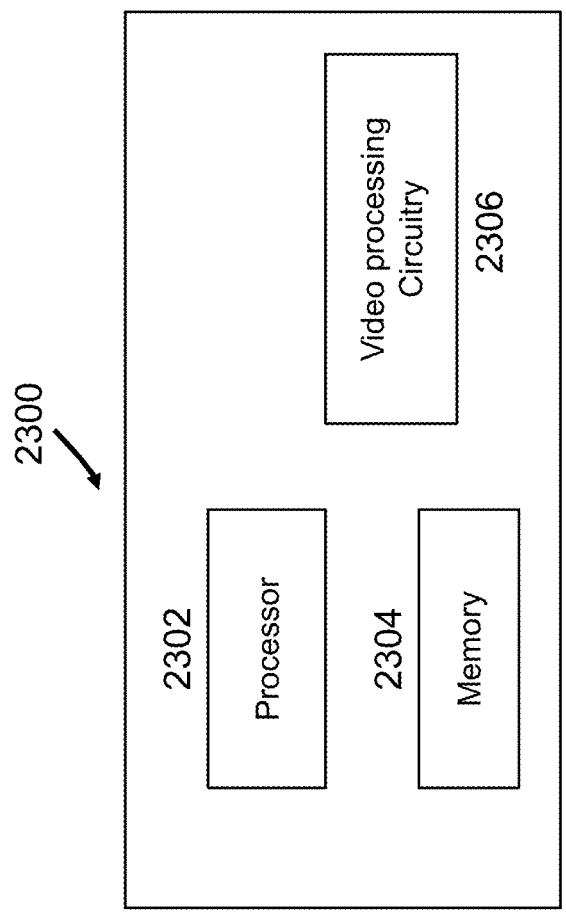
FIG. 23 is a block diagram of an example of a hardware platform for implementing a visual media decoding or a visual media encoding technique described in the present document.

FIG. 23 is a block diagram of a video processing apparatus 2300. The apparatus 2300 may be used to implement one or more of the methods described herein. The apparatus 2300 may be embodied in a smartphone, tablet, computer, Internet of Things (IoT) receiver, and so on. The apparatus 2300 may include one or more processors 2302, one or more memories 2304 and video processing hardware 2306. The processor(s) 2302 may be configured to implement one or more methods described in the present document. The memory (memories) 2304 may be used for storing data and code used for implementing the methods and techniques described herein. The video processing hardware 2306 may be used to implement, in hardware circuitry, some techniques described in the present document.

In some embodiments, the video coding methods may be implemented using an apparatus that is implemented on a hardware platform as described with respect to FIG. 23.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 24:
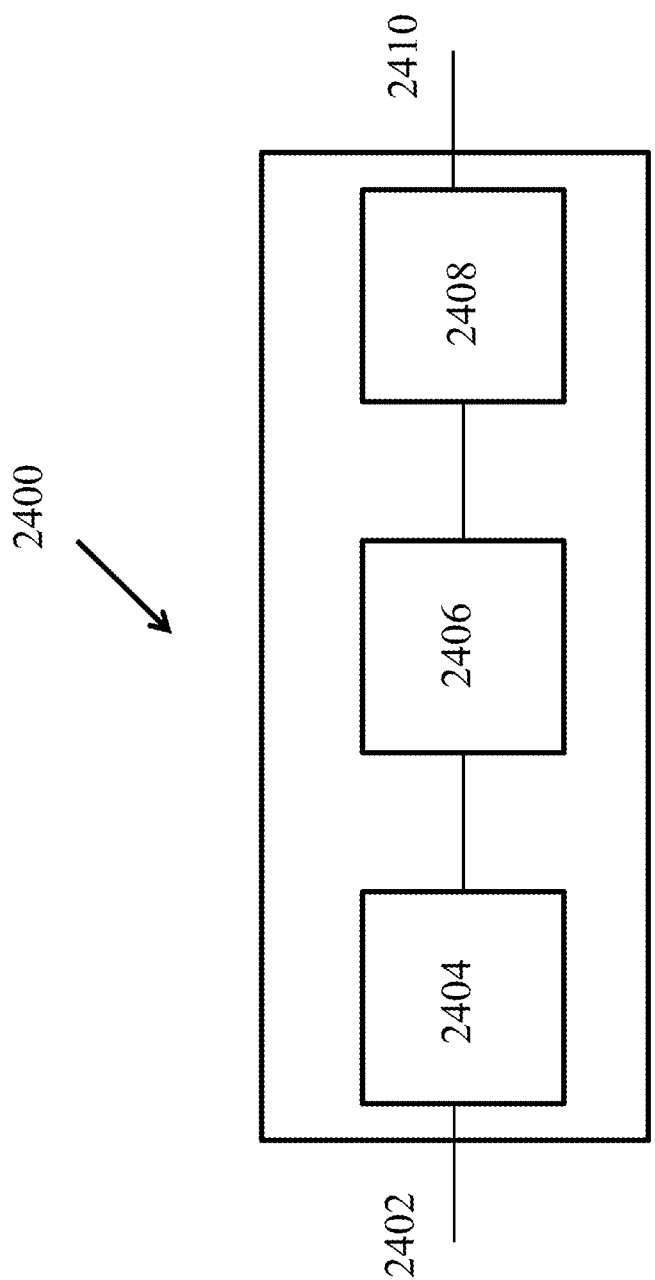
FIG. 24 is a block diagram of an example video processing system in which disclosed techniques may be implemented.

FIG. 24 is a block diagram showing an example video processing system 2400 in which various techniques disclosed herein may be implemented. Various implementations may include some or all of the components of the system 2400. The system 2400 may include input 2402 for receiving video content. The video content may be received in a raw or uncompressed format, e.g., 8 or 10 bit multi-component pixel values, or may be in a compressed or encoded format. The input 2402 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2400 may include a coding component 2404 that may implement the various coding or encoding methods described in the present document. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by the component 2408 for generating pixel values or displayable video that is sent to a display interface 2410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

It will be appreciated that several techniques have been disclosed that will benefit video encoder and decoder embodiments incorporated within video processing devices such as smartphones, laptops, desktops, and similar devices by allowing the use of intra coding tool in encoding or decoding of video or images.

In some embodiments, the following technical solutions be may implemented:

A1. A method of video processing, comprising: determining, for a current block of video, that at least one of a first coding mode in which pulse code modulation (PCM) is used or a second coding mode in which multiple reference line based intra prediction (MRLIP) is used is enabled; and performing, based on the first coding mode or the second coding mode, a conversion between the current block and a bitstream representation of the video, wherein a first indication indicative of use of the first coding mode and/or a second indication indicative of use of the second coding mode are included in the bitstream representation according to an ordering rule.

A2. The method of solution A1, wherein the ordering rule specifies that the first indication is in the bitstream representation before the second indication in a decoding order.

A3. The method of solution A1, wherein the bitstream representation omits a reference line index used for the second coding mode upon a determination that the first coding mode is enabled.

A4. The method of solution A1, wherein the bitstream representation further comprises a reference line index used for the second coding mode upon a determination that the first coding mode is disabled.

A5. The method of solution A1, wherein the bitstream representation omits the first indication upon a determination that the bitstream representation comprises the second indication.

A6. The method of solution A1, wherein an adaptive loop filter (ALF) process for the current block is disabled upon a determination that the first coding mode is enabled.

A7. The method of solution A6, wherein whether an indication of the ALF process is included in the bitstream representation or not is based on the first indication.

A8. The method of solution A6, wherein whether the first indication is included in the bitstream representation or not is based on an indication of the ALF process.

A9. The method of solution A6, wherein the first indication is signaled in the bitstream representation prior to an indication of the ALF process upon a determination that a size of the current block is equal to a size of a coding tree unit (CTU).

A10. The method of solution A6, wherein the first indication is signaled in the bitstream representation prior to an indication of a sample adaptive offset (SAO) process upon a determination that a size of the current block is equal to a size of a coding tree unit (CTU).

A11. The method of any of solutions A1 to A10, wherein pcm_loop_filter_disabled_flag=1.

A12. A method of video processing, comprising: determining, for a conversion between a current block of video and a bitstream representation of the video, based on a color component representation of the video, at least one flag associated with a coding mode based on a pulse code modulation of the current block; and performing, based on the determining, the conversion.

A13. The method of solution A12, wherein the at least one flag is based on whether separate partition tree structures are used for each component of the color component representation.

A14. The method of solution A12, wherein the at least one flag comprises a first flag for a luma component of the color component representation, and wherein the at least one flag further comprises a second flag for a chroma component of the color component representation.

A15. The method of solution A12, wherein the color component representation comprises three color components, and wherein the at least one flag comprises three flags for each of the three color components.

A16. The method of solution A12, wherein the at least one flag comprises an indication of enabling the pulse code modulation that corresponds to an indication of enabling the pulse code modulation for each component of the color component representation.

A17. The method of solution A16, wherein a filtering process for a component of the color component representation is based on the indication of enabling the pulse code modulation for a corresponding component of the color component representation.

A18. The method of solution A12, wherein the at least one flag comprises an indication of enabling the pulse code modulation for a luma component of the color component representation, and wherein an indication of enabling the pulse code modulation for a chroma component of the color component representation is inherited from a location within the luma component.

A19. The method of solution A18, wherein the location is a center position of the luma component.

A20. A method of video processing, comprising: performing a conversion between a current block of a video region of a video and a bitstream representation of the video, wherein the bitstream representation is formatted according to a rule regarding an applicability of a pulse code modulation (PCM) to the current block, and wherein the rule specifies to omit an indication of the PCM at a current block level upon a determination that an indication of disabling the PCM is included at a video region level.

A21. The method of solution A20, wherein the indication of the PCM is signaled in a video parameter set (VPS), a picture parameter set (PPS), a picture header, a slice header, a tile group header, a tile, a coding tree unit (CTU) or a CTU row.

A22. A method of video processing, comprising: making a decision, based on a size of a current block of video, regarding enabling a pulse code modulation (PCM) coding mode for the current block; and performing, based on the decision, a conversion between the current block and a bitstream representation of the video.

A23. The method of solution A22, wherein the PCM coding mode is enabled upon a determination that the current block comprises less than 64 samples.

A24. The method of solution A23, wherein the size of the current block is 4×4, 4×8 or 8×4.

A25. The method of solution A23, wherein a minimum block size for the current block with a pcm_flag equal to 1 is set to (log 2_min_pcm_luma_coding_block_size_minus2+2).

A26. The method of solution A22, wherein the PCM coding mode is enabled upon a determination that the size of the current block is greater than or equal to 64×64.

A27. The method of solution A22, wherein the PCM coding mode is enabled upon a determination that a size of a largest coding unit (LCU) is equal to 128×128.

A28. The method of solution A22, wherein the PCM coding mode is enabled, and wherein an indication of a maximum or a minimum number of samples in the current block is signaled in the bitstream representation.

A29. The method of solution A28, wherein the indication comprises a difference between the maximum number of samples and the minimum number of samples.

A30. The method of solution A28, wherein the indication comprises a base-2 logarithm of the maximum or the minimum number of samples.

A31. The method of solution A28, wherein the indication comprises a base-2 logarithm of a difference between the maximum number of samples and the minimum number of samples.

A32. A method of video processing, comprising: determining, for a conversion between a current block of a video and a bitstream representation of the video, a minimum allowed value for a height or a width of the current block, wherein the minimum allowed value for the height is signaled or derived separately from the minimum allowed value for the width; and performing, based on the determining, the conversion.

A33. The method of solution A32, wherein the bitstream representation further comprises a maximum allowed value for the height or the width, and wherein the maximum allowed value for the height is signaled or derived separately from the maximum allowed value for the width.

A34. The method of solution A32, wherein the bitstream representation omits the minimum allowed value for the height or the width, and wherein the minimum allowed value is inherited from a minimum size of a coding unit (CU) block.

A35. The method of solution A32, wherein the bitstream representation omits a maximum allowed value for the height or the width, and wherein the maximum allowed value is inherited from a maximum size of a coding unit (CU) block.

A36. The method of any of solutions A32 to A35, wherein the height is different from the width.

A37. The method of solution A32, wherein the bitstream representation comprising an indication of enabling a pulse code modulation (PCM) coding mode for the current block is based on (a) the width of the current block being no smaller than the minimum allowed value for the width and being no larger than a maximum allowed value for the width, or (b) the height of the current block being no smaller than the minimum allowed value of the height and being no larger than a maximum allowed value for the height.

A38. The method of solution A32 or 33, wherein a pulse code modulation (PCM) coding mode for the current block is enabled.

A39. A method of video processing, comprising: configuring, upon a determination that an indication of a current block of video being coded with a pulse code modulation (PCM) coding mode is signaled in a bitstream representation of the video, a color component representation of the video; and performing, based on the configuring, a conversion between the current block and the bitstream representation.

A40. The method of solution A39, wherein an allowed size for each component of the color component representation is signaled separately.

A41. The method of solution A39, wherein the configuring is based on a color sub-sampling format of the color component representation.

A42. The method of solution A41, wherein the color sub-sampling format is 4:2:0 or 4:4:4.

A43. The method of any of solutions A1 to A42, the conversion generates the current block from the bitstream representation.

A44. The method of any of solutions A1 to 42, wherein the conversion generates the bitstream representation from the current block.

A45. The method of any of solutions A1 to A42, wherein performing the conversion comprises parsing the bitstream representation based on one or more decoding rules.

A46. An apparatus in a video system comprising a processor and a non-transitory memory with instructions thereon, wherein the instructions upon execution by the processor, cause the processor to implement the method in any one of solutions A1 to A45.

A47. A computer program product stored on a non-transitory computer readable media, the computer program product including program code for carrying out the method in any one of solutions A1 to A45.

In some embodiments, the following technical solutions be may implemented:

B1. A method of video processing, comprising: determining, for a conversion between a current block of video and a bitstream representation of the video, that a wide angular mode is disabled for the conversion due to use of a non-adjacent reference line mode for the conversion; and performing, based on the determining, the conversion, wherein the non-adjacent reference line mode uses non-adjacent pixels from a reference line of the video for the conversion of the current block, and wherein the wide angular mode comprises an intra prediction direction beyond the 45 degree to −135 degree conventional angular intra prediction direction.

B2. The method of solution B1, wherein the conversion skips a mapping between a signaled mode and at least one index of the wide angular mode.

B3. A method of video processing, comprising: making a decision, based on a color sub-sampling format of a video for a conversion between a current block of the video and a bitstream representation of the video, regarding whether a multiple reference line (MRL) coding mode is enabled for the current block or a signaling format of one or more reference line indexes is used for the MRL coding mode; and performing, based on the decision, the conversion.

B4. The method of solution B3, wherein the MRL coding mode is enabled for three color components of a color component representation of the video upon a determination that the color sub-sampling format is 4:4:4.

B5. The method of solution B3, wherein a single reference line index of the one or more reference line indexes is coded for three components of a color component representation of the video.

B6. The method of solution B3, wherein a first reference line index of the one or more reference line indexes is coded for a luma component of a color component representation of the video, and wherein a second reference line index is coded for two other color components of the color component representation.

B7. The method of solution B3, wherein the one or more reference line indexes comprise at least two reference line indexes that are coded using predictive coding.

B8. The method of solution B3, wherein the bitstream representation comprises a single flag indicting that each of the one or more reference line indexes are identical.

B9. The method of solution B3, wherein the MRL coding mode is enabled, and wherein different components of a color component representation of the video select different candidate lines from the MRL coding mode.

B10. The method of solution B9, wherein Cb and Cr components of the color component representation select the candidate lines from neighboring first and second lines.

B11. A method of video processing, comprising: selecting, upon a determination that an inter-intra mode and a multiple reference line intra prediction (MRLIP) mode are enabled for a current block of video, a line or a column that is non-adjacent to the current block for an intra prediction process of the inter-intra mode; and performing, based on the line or the column, a conversion between the current block and a bitstream representation of the video.

B12. The method of solution B11, wherein the bitstream representation comprises an indication of the line or the column.

B13. The method of solution B11, wherein an indication of enabling the inter-intra mode and the MRLIP mode is signaled in a sequence parameter set (SPS), a video parameter set (VPS), a picture parameter set (PPS), a picture header, a slice header, a tile group header or a coding tree unit (CTU).

B14. A method of video processing, comprising: performing, for a current block of a video coded using a multiple reference line intra prediction (MRLIP) mode that uses a line that is non-adjacent to the current block, a conversion between the current block and a bitstream representation of the video, wherein the MRLIP further uses a most probable mode (MPM) list, and wherein performing the conversion comprises replacing a first mode (M1) of the MPM list with a second mode (M2) of the MPM list.

B15. The method of solution B14, wherein the first mode is a DC mode, a planar mode, a wide angular mode, or any non-angular mode.

B16. The method of solution B14, wherein deriving the second mode is based on remaining modes in the MPM list.

B17. A method of video processing, comprising: performing, for a current block of a video coded using a multiple reference line intra prediction (MRLIP) mode that uses a line that is non-adjacent to the current block, a conversion between the current block and a bitstream representation of the video, wherein the bitstream representation comprises a coded index of a mode in a fixed candidate list instead of a coded index of a mode in a most probable mode (MPM) list.

B18. The method of solution B17, wherein the fixed candidate list comprises horizontal modes or vertical modes.

B19. The method of solution B17, wherein the fixed candidate list is predetermined.

B20. The method of solution B17, wherein the fixed candidate list is signaled in a sequence parameter set (SPS), a video parameter set (VPS), a picture parameter set (PPS), a picture header, a slice header, a tile group header or a coding tree unit (CTU).

B21. The method of solution B17, wherein the fixed candidate list is based on a height or a width of the current block.

B22. A method of video processing, comprising: determining, for a conversion between a current block of video and a bitstream representation of the video using a multiple reference line (MRL) coding mode, that the bitstream representation includes a first index corresponding to above rows used in a prediction of the current block and a second index corresponding to left columns used in the prediction; and performing, based on the determining, the conversion.

B23. The method of solution B22, wherein different values of the first index and the second index correspond to different sets of allowed intra prediction modes.

B24. The method of solution B23, wherein the different sets of allowed intra prediction modes are predetermined.

B25. The method of solution B23, wherein the different sets of allowed intra prediction modes are signaled in a sequence parameter set (SPS), a video parameter set (VPS), a picture parameter set (PPS), a picture header, a slice header, a tile group header or a coding tree unit (CTU).

B26. The method of any of solutions B1 to B25, the conversion generates the current block from the bitstream representation.

B27. The method of any of solutions B1 to B25, wherein the conversion generates the bitstream representation from the current block.

B28. An apparatus in a video system comprising a processor and a non-transitory memory with instructions thereon, wherein the instructions upon execution by the processor, cause the processor to implement the method in any one of solutions B1 to B27.

B29. A computer program product stored on a non-transitory computer readable media, the computer program product including program code for carrying out the method in any one of solutions B1 to B27.

The various rules described in the present document may be pre-specified and stored in embodiments in the form of instructions, code or hardware circuits. A bitstream representation of a current video block may include contiguous or non-contiguous bits, as defined by a format for the bitstream. For example, some information pertaining to the current video block may be stored in a header field in the bitstream representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of coding video data, comprising:
performing a conversion between a current video unit of a video and a bitstream of the video, wherein the current video unit is a luma video unit; and applying a filtering process for the current video unit based on a first indication during the conversion, wherein the filtering process is a deblocking filter process;

wherein one of the first indication and a second indication is used to indicate a usage of a pulse code modulation (PCM) for the current video unit, and another of the first indication and the second indication is used to indicate mode information of a multiple reference line based intra prediction (MRLIP) for the current video unit, and wherein whether the second indication is present in the bitstream is related to the first indication, wherein, in response to a dual tree partition or a single tree partition being applied, the first indication is a luma indication and is used to indicate the usage of the PCM for the current video unit, and the second indication is used to indicate the mode information of the MRLIP for the current video unit, wherein, in response to the first indication indicating that the PCM is applied to the current video unit, the second indication is not present in the bitstream, and wherein a chroma PCM indication is further used to indicate whether to apply the PCM on at least one chroma component, and no chroma MRLIP indication is used for the at least one chroma component.

2. The method of claim 1, wherein the mode information comprises a reference line index.

3. The method of claim 1, further comprising:
applying another filtering process for the at least one chroma component based on the chroma PCM indication during the conversion.

4. The method of claim 3, wherein the another filtering process is another deblocking filter process.

5. The method of claim 1, wherein the first indication and the chroma PCM indication are usage flags.

6. The method of claim 1, wherein, in response to the MRLIP being applied, the first indication is not present in the bitstream.

7. The method of claim 6, wherein, in response to the MRLIP being not applied, the first indication is present in the bitstream.

8. The method of claim 1, wherein the conversion includes encoding the current video unit into the bitstream.

9. The method of claim 1, wherein the conversion includes decoding the current video unit from the bitstream.

10. An apparatus for coding video data comprising a processor and a non-transitory memory with instructions thereon, wherein the instructions upon execution by the processor, cause the processor to:
perform a conversion between a current video unit of a video and a bitstream of the video, wherein the current video unit is a luma video unit; and
apply a filtering process for the current video unit based on a first indication during the conversion, wherein the filtering process is a deblocking filter process;

wherein one of the first indication and a second indication is used to indicate a usage of a pulse code modulation (PCM) for the current video unit, and another of the first indication and the second indication is used to indicate mode information of a multiple reference line based intra prediction (MRLIP) for the current video unit, and wherein whether the second indication is present in the bitstream is related to the first indication, wherein, in response to a dual tree partition or a single tree partition being applied, the first indication is a luma indication and is used to indicate the usage of the PCM for the current video unit, and the second indication is used to indicate the mode information of the MRLIP for the current video unit, wherein in response to the first indication indicating that the PCM is applied to the current video unit, the second indication is not present in the bitstream, and wherein a chroma PCM indication is further used to indicate whether to apply the PCM on at least one chroma component, and no chroma MRLIP indication is used for the at least one chroma component.

11. The apparatus of claim 10, wherein the mode information comprises a reference line index.

12. The apparatus of claim 10, further comprising:
applying another filtering process for the at least one chroma component based on the chroma PCM indication during the conversion.

13. The apparatus of claim 12, wherein the another filtering process is another deblocking filter process.

14. The apparatus of claim 10, wherein the first indication and the chroma PCM indication are usage flags.

15. The apparatus of claim 10, wherein, in response to the MRLIP being applied, the first indication is not present in the bitstream.

16. The apparatus of claim 15, wherein, in response to the MRLIP being not applied, the first indication is present in the bitstream.

17. The apparatus of claim 10, wherein the conversion includes encoding the current video unit into the bitstream.

18. The apparatus of claim 10, wherein the conversion includes decoding the current video unit from the bitstream.

19. A non-transitory computer-readable storage medium storing instructions that cause a processor to:
perform a conversion between a current video unit of a video and a bitstream of the video, wherein the current video unit is a luma video unit; and
apply a filtering process for the current video unit based on a first indication during the conversion, wherein the filtering process is a deblocking filter process;

wherein one of the first indication and a second indication is used to indicate a usage of a pulse code modulation (PCM) for the current video unit, and another of the first and the second indications is used to indicate mode information of a multiple reference line based intra prediction (MRLIP) for the current video unit, and wherein whether the second indication is present in the bitstream is related to the first indication, wherein, in response to a dual tree partition or a single tree partition being applied, the first indication is a luma indication and is used to indicate the usage of the PCM for the current video unit, and the second indication is used to indicate the mode information of the MRLIP for the current video unit, wherein, in response to the first indication indicating that the PCM is applied to the current video unit, the second indication is not present in the bitstream, and wherein a chroma PCM indication is further used to indicate whether to apply the PCM on at least one chroma component, and no chroma MRLIP indication is used for the at least one chroma component.

20. A non-transitory computer-readable recording medium storing instructions that cause a method to be performed by a video processing apparatus, wherein the method comprises:
generating, for a conversion between a current video unit of a video and a bitstream of a video, the bitstream of the video from the current video unit of the video, wherein the current video unit is a luma video unit;

applying a filtering process for the current video unit based on a first indication during the conversion, wherein the filtering process is a deblocking filter process; and storing the bitstream of the video, wherein one of the first indication and a second indication is used to indicate a usage of a pulse code modulation (PCM) for a current video unit, and another of the first and the second indications is used to indicate mode information of a multiple reference line based intra prediction (MRLIP) for the current video unit, and wherein whether the second indication is present in the bitstream is related to the first indication, wherein, in response to a dual tree partition or a single tree partition being applied, the first indication is a luma indication and is used to indicate the usage of the PCM for the current video unit, and the second indication is used to indicate the mode information of the MRLIP for the current video unit, wherein, in response to the first indication indicating that the PCM is applied to the current video unit, the second indication is not present in the bitstream, and wherein a chroma PCM indication is further used to indicate whether to apply the PCM on at least one chroma component, and no chroma MRLIP indication is used for the at least one chroma component.

* * * * *